US010142479B2

(12) United States Patent
Spottiswoode et al.

(10) Patent No.: US 10,142,479 B2
(45) Date of Patent: Nov. 27, 2018

(54) CALL MAPPING SYSTEMS AND METHODS USING VARIANCE ALGORITHM (VA) AND/OR DISTRIBUTION COMPENSATION

(71) Applicant: Afiniti Europe Technologies Limited, Cheshire (GB)

(72) Inventors: S. James P. Spottiswoode, Beverly Hills, CA (US); Zia Chishti, Washington, DC (US)

(73) Assignee: Afiniti Europe Technologies Limited, Cheshire (GB)

( * ) Notice: Subject to any disclaimer, the term of this patent is extended or adjusted under 35 U.S.C. 154(b) by 0 days.

(21) Appl. No.: 14/788,517

(22) Filed: Jun. 30, 2015

(65) Prior Publication Data

US 2015/0304497 A1    Oct. 22, 2015

Related U.S. Application Data

(63) Continuation of application No. 14/530,058, filed on Oct. 31, 2014, which is a continuation of application
(Continued)

(51) Int. Cl.
*H04M 3/00*      (2006.01)
*H04M 3/523*      (2006.01)
(Continued)

(52) U.S. Cl.
CPC .... *H04M 3/5233* (2013.01); *G06F 17/30345* (2013.01); *G06Q 10/06398* (2013.01);
(Continued)

(58) Field of Classification Search
CPC ................. H04M 3/51; H04M 3/5233; H04M 2203/402; H04M 3/5183; H04M 3/523
(Continued)

(56) References Cited

U.S. PATENT DOCUMENTS

| 5,155,763 A | 10/1992 | Bigus et al. |
| 5,206,903 A | 4/1993 | Kohler et al. |

(Continued)

FOREIGN PATENT DOCUMENTS

| AU | 2008349500 C1 | 5/2014 |
| AU | 2009209317 B2 | 5/2014 |

(Continued)

OTHER PUBLICATIONS

Anonymous. (2006) "Performance Based Routing in Profit Call Centers," The Decision Makers' Direct, located at www.decisioncraft.com, Issue Jan. 6, 2012 (3 pages).
(Continued)

*Primary Examiner* — Ahmad F Matar
*Assistant Examiner* — Jirapon Intavong
(74) *Attorney, Agent, or Firm* — Wilmer Cutler Pickering Hale and Dorr LLP

(57) ABSTRACT

Method, system and program product, comprising obtaining agent performance data; ranking, agents based the agent performance data; dividing agents into agent performance ranges; partitioning callers based on criteria into a set of partitions; determining for each partition an outcome value for a first agent performance range and a second agent performance range; calculating for the partitions a respective outcome value difference indicator based on the outcome value for the first agent performance range and the outcome value for the second agent performance range for the partition; matching a respective agent to a respective caller in one of the partitions, based on the outcome value difference indicators for the partitions.

20 Claims, 23 Drawing Sheets

Related U.S. Application Data

No. 13/843,724, filed on Mar. 15, 2013, now Pat. No. 8,879,715.

(60) Provisional application No. 61/615,788, filed on Mar. 26, 2012, provisional application No. 61/615,779, filed on Mar. 26, 2012, provisional application No. 61/615,772, filed on Mar. 26, 2012.

(51) Int. Cl.
*H04M 3/51* (2006.01)
*G06Q 10/06* (2012.01)
*G06F 17/30* (2006.01)

(52) U.S. Cl.
CPC ....... *H04M 3/5175* (2013.01); *H04M 3/5191* (2013.01); *H04M 3/523* (2013.01); *H04M 3/5232* (2013.01); *H04M 3/5234* (2013.01); *H04M 3/5238* (2013.01); *H04M 3/5235* (2013.01); *H04M 2203/2061* (2013.01); *H04M 2203/401* (2013.01); *H04M 2203/556* (2013.01)

(58) Field of Classification Search
USPC ........................................ 379/265.01, 265.06
See application file for complete search history.

(56) References Cited

U.S. PATENT DOCUMENTS

| | | | |
|---|---|---|---|
| 5,327,490 A | 7/1994 | Cave | |
| 5,537,470 A | 7/1996 | Lee | |
| 5,702,253 A | 12/1997 | Bryce et al. | |
| 5,825,869 A | 10/1998 | Brooks et al. | |
| 5,903,641 A | 5/1999 | Tonisson | |
| 5,907,601 A | 5/1999 | David et al. | |
| 5,926,538 A | 7/1999 | Deryugin et al. | |
| 6,049,603 A | 4/2000 | Schwartz et al. | |
| 6,052,460 A | 4/2000 | Fisher et al. | |
| 6,064,731 A | 5/2000 | Flockhart et al. | |
| 6,088,444 A | 7/2000 | Walker et al. | |
| 6,163,607 A | 12/2000 | Bogart et al. | |
| 6,222,919 B1 | 4/2001 | Hollatz et al. | |
| 6,292,555 B1 | 9/2001 | Okamoto | |
| 6,324,282 B1 | 11/2001 | McIllwaine et al. | |
| 6,333,979 B1 | 12/2001 | Bondi et al. | |
| 6,389,132 B1 | 5/2002 | Price | |
| 6,389,400 B1 | 5/2002 | Bushey et al. | |
| 6,408,066 B1 | 6/2002 | Andruska et al. | |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,526,135 B1 | 2/2003 | Paxson | |
| 6,535,601 B1 | 3/2003 | Flockhart et al. | |
| 6,570,980 B1 | 5/2003 | Baruch | |
| 6,587,556 B1 | 7/2003 | Judkins et al. | |
| 6,603,854 B1 | 8/2003 | Judkins et al. | |
| 6,639,976 B1 | 10/2003 | Shellum et al. | |
| 6,661,889 B1 | 12/2003 | Flockhart et al. | |
| 6,704,410 B1 | 3/2004 | McFarlane et al. | |
| 6,707,904 B1 | 3/2004 | Judkins et al. | |
| 6,714,643 B1* | 3/2004 | Gargeya ................ | H04M 3/523 379/265.02 |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1 | 9/2004 | Bala | |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,922,466 B1 | 7/2005 | Peterson et al. | |
| 6,937,715 B2 | 8/2005 | Delaney | |
| 6,956,941 B1 | 10/2005 | Duncan et al. | |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,068,775 B1 | 6/2006 | Lee | |
| 7,092,509 B1 | 8/2006 | Mears et al. | |
| 7,103,172 B2 | 9/2006 | Brown et al. | |
| 7,158,628 B2 | 1/2007 | McConnell et al. | |
| 7,184,540 B2 | 2/2007 | Dezonno et al. | |
| 7,209,549 B2 | 4/2007 | Reynolds et al. | |
| 7,231,032 B2 | 6/2007 | Nevman et al. | |
| 7,231,034 B1 | 6/2007 | Rikhy et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1* | 9/2007 | Wu .................... | H04M 3/5233 379/265.11 |
| 7,353,388 B1 | 4/2008 | Gilman et al. | |
| 7,398,224 B2 | 7/2008 | Cooper | |
| 7,593,521 B2 | 9/2009 | Becerra et al. | |
| 7,676,034 B1 | 3/2010 | Wu et al. | |
| 7,725,339 B1 | 5/2010 | Aykin | |
| 7,734,032 B1 | 6/2010 | Kiefhaber et al. | |
| 7,798,876 B2 | 9/2010 | Mix | |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,175,253 B2 | 5/2012 | Knott et al. | |
| 8,229,102 B2 | 7/2012 | Knott et al. | |
| 8,249,245 B2 | 8/2012 | Jay et al. | |
| 8,295,471 B2 | 10/2012 | Spottiswoode et al. | |
| 8,300,798 B1 | 10/2012 | Wu et al. | |
| 8,359,219 B2 | 1/2013 | Chishti et al. | |
| 8,433,597 B2 | 4/2013 | Chishti et al. | |
| 8,472,611 B2 | 6/2013 | Chishti | |
| 8,565,410 B2 | 10/2013 | Chishti et al. | |
| 8,634,542 B2 | 1/2014 | Spottiswoode et al. | |
| 8,644,490 B2 | 2/2014 | Stewart | |
| 8,670,548 B2 | 3/2014 | Xie et al. | |
| 8,699,694 B2 | 4/2014 | Chishti et al. | |
| 8,712,821 B2 | 4/2014 | Spottiswoode | |
| 8,718,271 B2 | 5/2014 | Spottiswoode | |
| 8,724,797 B2 | 5/2014 | Chishti et al. | |
| 8,731,178 B2 | 5/2014 | Chishti et al. | |
| 8,737,595 B2 | 5/2014 | Chishti et al. | |
| 8,750,488 B2 | 6/2014 | Spottiswoode et al. | |
| 8,781,100 B2 | 7/2014 | Spottiswoode et al. | |
| 8,781,106 B2 | 7/2014 | Afzal | |
| 8,792,630 B2 | 7/2014 | Chishti et al. | |
| 8,824,658 B2 | 9/2014 | Chishti | |
| 8,879,715 B2 | 11/2014 | Spottiswoode et al. | |
| 8,903,079 B2 | 12/2014 | Xie et al. | |
| 8,929,537 B2 | 1/2015 | Chishti et al. | |
| 8,995,647 B2 | 3/2015 | Li et al. | |
| 9,020,137 B2 | 4/2015 | Chishti et al. | |
| 9,025,757 B2 | 5/2015 | Spottiswoode et al. | |
| 9,215,323 B2 | 12/2015 | Chishti | |
| 9,277,055 B2 | 3/2016 | Spottiswoode et al. | |
| 9,300,802 B1 | 3/2016 | Chishti | |
| 9,426,296 B2 | 8/2016 | Chishti et al. | |
| 9,712,676 B1 | 7/2017 | Chishti | |
| 9,712,679 B2 | 7/2017 | Chishti et al. | |
| 2001/0032120 A1 | 10/2001 | Stuart et al. | |

(56) References Cited

U.S. PATENT DOCUMENTS

| | | | |
|---|---|---|---|
| 2002/0018554 A1* | 2/2002 | Jensen | H04M 3/5233 379/265.01 |
| 2002/0046030 A1 | 4/2002 | Haritsa et al. | |
| 2002/0059164 A1 | 5/2002 | Shtivelman | |
| 2002/0082736 A1 | 6/2002 | Lech et al. | |
| 2002/0110234 A1 | 8/2002 | Walker et al. | |
| 2002/0111172 A1 | 8/2002 | DeWolf et al. | |
| 2002/0131399 A1 | 9/2002 | Philonenko | |
| 2002/0138285 A1 | 9/2002 | DeCotiis et al. | |
| 2002/0143599 A1 | 10/2002 | Nourbakhsh et al. | |
| 2002/0161765 A1 | 10/2002 | Kundrot et al. | |
| 2002/0184069 A1 | 12/2002 | Kosiba et al. | |
| 2002/0196845 A1 | 12/2002 | Richards et al. | |
| 2003/0002653 A1 | 1/2003 | Uckun | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1 | 11/2003 | Pericle | |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0098274 A1 | 5/2004 | Dezonno et al. | |
| 2004/0101127 A1 | 5/2004 | Dezonno et al. | |
| 2004/0109555 A1 | 6/2004 | Williams | |
| 2004/0133434 A1 | 7/2004 | Szlam et al. | |
| 2004/0210475 A1 | 10/2004 | Starnes et al. | |
| 2004/0230438 A1 | 11/2004 | Pasquale et al. | |
| 2004/0267816 A1 | 12/2004 | Russek | |
| 2005/0013428 A1 | 1/2005 | Walters | |
| 2005/0043986 A1 | 2/2005 | McConnell et al. | |
| 2005/0047581 A1 | 3/2005 | Shaffer et al. | |
| 2005/0047582 A1 | 3/2005 | Shaffer et al. | |
| 2005/0071223 A1 | 3/2005 | Jain et al. | |
| 2005/0129212 A1 | 6/2005 | Parker | |
| 2005/0135593 A1 | 6/2005 | Becerra et al. | |
| 2005/0135596 A1 | 6/2005 | Zhao | |
| 2005/0187802 A1 | 8/2005 | Koeppel | |
| 2005/0195960 A1 | 9/2005 | Shaffer et al. | |
| 2005/0286709 A1 | 12/2005 | Horton et al. | |
| 2006/0098803 A1 | 5/2006 | Bushey et al. | |
| 2006/0110052 A1 | 5/2006 | Finlayson | |
| 2006/0124113 A1 | 6/2006 | Roberts | |
| 2006/0184040 A1 | 8/2006 | Keller et al. | |
| 2006/0222164 A1 | 10/2006 | Contractor et al. | |
| 2006/0233346 A1 | 10/2006 | McIlwaine et al. | |
| 2006/0262918 A1 | 11/2006 | Karnalkar et al. | |
| 2006/0262922 A1 | 11/2006 | Margulies et al. | |
| 2007/0036323 A1 | 2/2007 | Travis | |
| 2007/0071222 A1 | 3/2007 | Flockhart et al. | |
| 2007/0116240 A1 | 5/2007 | Foley et al. | |
| 2007/0121602 A1 | 5/2007 | Sin et al. | |
| 2007/0121829 A1 | 5/2007 | Tal et al. | |
| 2007/0136342 A1 | 6/2007 | Singhai et al. | |
| 2007/0154007 A1 | 7/2007 | Bernhard | |
| 2007/0174111 A1 | 7/2007 | Anderson et al. | |
| 2007/0198322 A1 | 8/2007 | Bourne et al. | |
| 2007/0219816 A1 | 9/2007 | Van Luchene et al. | |
| 2007/0274502 A1 | 11/2007 | Brown | |
| 2008/0002823 A1 | 1/2008 | Fama et al. | |
| 2008/0008309 A1 | 1/2008 | Dezonno et al. | |
| 2008/0046386 A1 | 2/2008 | Pieraccinii et al. | |
| 2008/0065476 A1 | 3/2008 | Klein et al. | |
| 2008/0152122 A1 | 6/2008 | Idan et al. | |
| 2008/0181389 A1 | 7/2008 | Bourne et al. | |
| 2008/0199000 A1 | 8/2008 | Su et al. | |
| 2008/0267386 A1 | 10/2008 | Cooper | |
| 2008/0273687 A1 | 11/2008 | Knott et al. | |
| 2009/0043670 A1 | 2/2009 | Johansson et al. | |
| 2009/0086933 A1 | 4/2009 | Patel et al. | |
| 2009/0190740 A1 | 7/2009 | Chishti et al. | |
| 2009/0190743 A1 | 7/2009 | Spottiswoode | |
| 2009/0190744 A1 | 7/2009 | Xie et al. | |
| 2009/0190745 A1 | 7/2009 | Xie et al. | |
| 2009/0190746 A1 | 7/2009 | Chishti et al. | |
| 2009/0190747 A1 | 7/2009 | Spottiswoode | |
| 2009/0190748 A1 | 7/2009 | Chishti et al. | |
| 2009/0190749 A1 | 7/2009 | Xie et al. | |
| 2009/0190750 A1 | 7/2009 | Xie et al. | |
| 2009/0232294 A1 | 9/2009 | Xie et al. | |
| 2009/0234710 A1 | 9/2009 | Belgaied Hassine et al. | |
| 2009/0245493 A1 | 10/2009 | Chen et al. | |
| 2009/0304172 A1 | 12/2009 | Becerra et al. | |
| 2009/0318111 A1 | 12/2009 | Desai et al. | |
| 2009/0323921 A1* | 12/2009 | Spottiswoode | H04M 3/5232 379/265.12 |
| 2010/0020959 A1 | 1/2010 | Spottiswoode | |
| 2010/0020961 A1 | 1/2010 | Spottiswoode | |
| 2010/0054431 A1 | 3/2010 | Jaiswal et al. | |
| 2010/0054452 A1 | 3/2010 | Afzal | |
| 2010/0054453 A1 | 3/2010 | Stewart | |
| 2010/0086120 A1 | 4/2010 | Brussat et al. | |
| 2010/0111285 A1 | 5/2010 | Chishti | |
| 2010/0111286 A1 | 5/2010 | Chishti | |
| 2010/0111287 A1 | 5/2010 | Xie et al. | |
| 2010/0111288 A1 | 5/2010 | Afzal et al. | |
| 2010/0142698 A1 | 6/2010 | Spottiswoode et al. | |
| 2010/0183138 A1 | 7/2010 | Spottiswoode et al. | |
| 2011/0022357 A1 | 1/2011 | Vock et al. | |
| 2011/0031112 A1 | 2/2011 | Birang et al. | |
| 2011/0069821 A1 | 3/2011 | Korolev et al. | |
| 2011/0125048 A1 | 5/2011 | Causevic et al. | |
| 2012/0051536 A1 | 3/2012 | Chishti et al. | |
| 2012/0051537 A1 | 3/2012 | Chishti et al. | |
| 2012/0224680 A1 | 9/2012 | Spottiswoode et al. | |
| 2012/0278136 A1 | 11/2012 | Flockhart et al. | |
| 2013/0003959 A1 | 1/2013 | Nishikawa et al. | |
| 2013/0022194 A1* | 1/2013 | Flockhart | H04M 3/5233 379/265.06 |
| 2013/0251137 A1 | 9/2013 | Chishti et al. | |
| 2014/0044246 A1* | 2/2014 | Klemm | H04M 3/523 379/93.01 |
| 2014/0079210 A1 | 3/2014 | Kohler et al. | |
| 2014/0119531 A1 | 5/2014 | Tuchman et al. | |
| 2014/0341370 A1 | 11/2014 | Li et al. | |
| 2015/0055772 A1 | 2/2015 | Klemm et al. | |
| 2016/0080573 A1 | 3/2016 | Chishti | |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| EP | 1335572 A2 | 8/2003 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 A | 7/2013 |
| NZ | 587101 A | 7/2013 |
| NZ | 591486 A | 10/2013 |
| NZ | 592781 A | 12/2013 |

(56) References Cited

FOREIGN PATENT DOCUMENTS

| PH | 1-2010-501704 | | 2/2014 |
|---|---|---|---|
| PH | 1-2010-501705 | | 2/2015 |
| WO | WO-1999/017517 | A1 | 4/1999 |
| WO | WO-2001/063894 | A2 | 8/2001 |
| WO | WO-2006/124113 | A2 | 11/2006 |
| WO | WO-2009/097018 | A1 | 8/2009 |
| WO | WO-2010/053701 | A2 | 5/2010 |
| WO | WO-2011/081514 | A1 | 7/2011 |

OTHER PUBLICATIONS

Cleveland, William S., "Robust Locally Weighted Regression and Smoothing Scatterplots," Journal of the American Statistical Association, vol. 74, No. 368, pp. 829-836 (Dec. 1979).

Gans, N. et al. (2003), "Telephone Call Centers: Tutorial, Review and Research Prospects," Manufacturing & Service Operations Management, vol. 5, No. 2, pp. 79-141.

International Preliminary Report on Patentability issued in connection with PCT Application No. PCT/US2009/066254 dated Jun. 14, 2011 (6 pages).

International Search Report issued in connection with International Application No. PCT/US13/33268 dated May 31, 2013 (2 pages).

International Search Report issued in connection with PCT Application No. PCT/US/2009/054352 dated Mar. 12, 2010, 5 pages.

International Search Report issued in connection with PCT Application No. PCT/US2008/077042 dated Mar. 13, 2009 (3 pages).

International Search Report issued in connection with PCT Application No. PCT/US2009/031611 dated Jun. 3, 2009 (5 pages).

International Search Report issued in connection with PCT Application No. PCT/US2009/066254 dated Feb. 24, 2010 (4 pages).

International Search Report issued in connection with PCT/US2009/061537 dated Jun. 7, 2010 (5 pages).

International Search Report issued in connection with PCT/US2013/033261 dated Jun. 14, 2013 (3 pages).

International Search Report issued in connection with PCT/US2013/33265 dated Jul. 9, 2013 (2 pages).

Koole, G. (2004). "Performance Analysis and Optimization in Customer Contact Centers," Proceedings of the Quantitative Evaluation of Systems, First International Conference, Sep. 27-30, 2004 (4 pages).

Koole, G. et al. (Mar. 6, 2006). "An Overview of Routing and Staffing Algorithms in Multi-Skill Customer Contact Centers," Manuscript, 42 pages.

Ntzoufras, "Bayesian Modeling Using Winbugs". Wiley Interscience, Chapter 5, Normal Regression Models, Oct. 18, 2007, pp. 155-220 (67 pages).

Press, W. H. and Rybicki, G. B., "Fast Algorithm for Spectral Analysis of Unevenly Sampled Data," The Astrophysical Journal, vol. 338, pp. 277-280 (Mar. 1, 1989).

Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.

Stanley et al., "Improving call center operations using performance-based routing strategies," Calif. Journal of Operations Management, 6(1), 24-32, Feb. 2008; retrieved from http://userwww.sfsu.edu/saltzman/Publist.html.

Subsequent Substantive Examination Report ssued in connection with Philippines Application No. 1-2010-501705 dated Jul. 14, 2014 (1 page).

Substantive Examination Report issued in connection with Philippines Application No. 1/2011/500868 dated May 2, 2014 (1 page).

Written Opinion of the International Searching Aurhority issued in connection with PCT Application No. PCT/US2008/077042 dated Mar. 13, 2009, 6 pages.

Written Opinion of the International Searching Authority issued in connection with International Application No. PCT/US13/33268 dated May 31, 2013, 7 pages.

Written Opinion of the International Searching Authority issued in connection with PCT Application No. PCT/US/2009/054352 dated Mar. 12, 2010, 5 pages.

Written Opinion of the International Searching Authority issued in connection with PCT Application No. PCT/US2009/031611 dated Jun. 3, 2009, 7 pages.

Written Opinion of the International Searching Authority issued in connection with PCT Application No. PCT/US2009/066254 dated Feb. 4, 2010, 5 pages.

Written Opinion of the International Searching Authority issued in connection with PCT/US2009/061537 dated Jun. 7, 2010, 10 pages.

Written Opinion of the International Searching Authority issued in connection with PCT/US2013/033261 dated Jun. 14, 2013, 7 pages.

Written Opinion of the International Searching Authority issued in connection with PCT/US2013/33265 dated Jul. 9, 2013, 7 pages.

Japanese Office Action issued by the Japan Patent Office for Application No. 2015-503396 dated Jun. 29, 2016 (7 pages).

Canadian Office Action issued in Canadian Patent Application No. 2713526, dated Oct. 25, 2016, 7 pages.

Extended European Search Report issued by the European Patent Office for European Application No. 17154781.3 dated May 4, 2017 (7 pages).

Extended European Search Report issued by the European Patent Office for European Application No. 17171761.4 dated Aug. 30, 2017 (8 pages).

International Search Report and Written Opinion issued by the European Patent Office as International Searching Authority for International Application No. PCT/IB2016/001762 dated Feb. 20, 2017 (15 pages).

International Search Report and Written Opinion issued by the European Patent Office as International Searching Authority for International Application No. PCT/IB2016/001776 dated Mar. 3, 2017 (16 pages).

International Search Report and Written Opinion issued by the European Patent Office as International Searching Authority for International Application No. PCT/IB2017/000570 dated Jun. 30, 2017 (13 pages).

Japanese Office Action issued by the Japanese Patent Office for Japanese Application No. 2016-159338 dated Oct. 11, 2017 (12 pages).

Japanese Office Action issued by the Japanese Patent Office for Japanese Application No. 2016-189126 dated Oct. 19, 2017 (24 pages).

Extended European Search Report issued by the European Patent Office for European Application No. 18168620.5 dated Jun. 12, 2018 (9 pages).

* cited by examiner

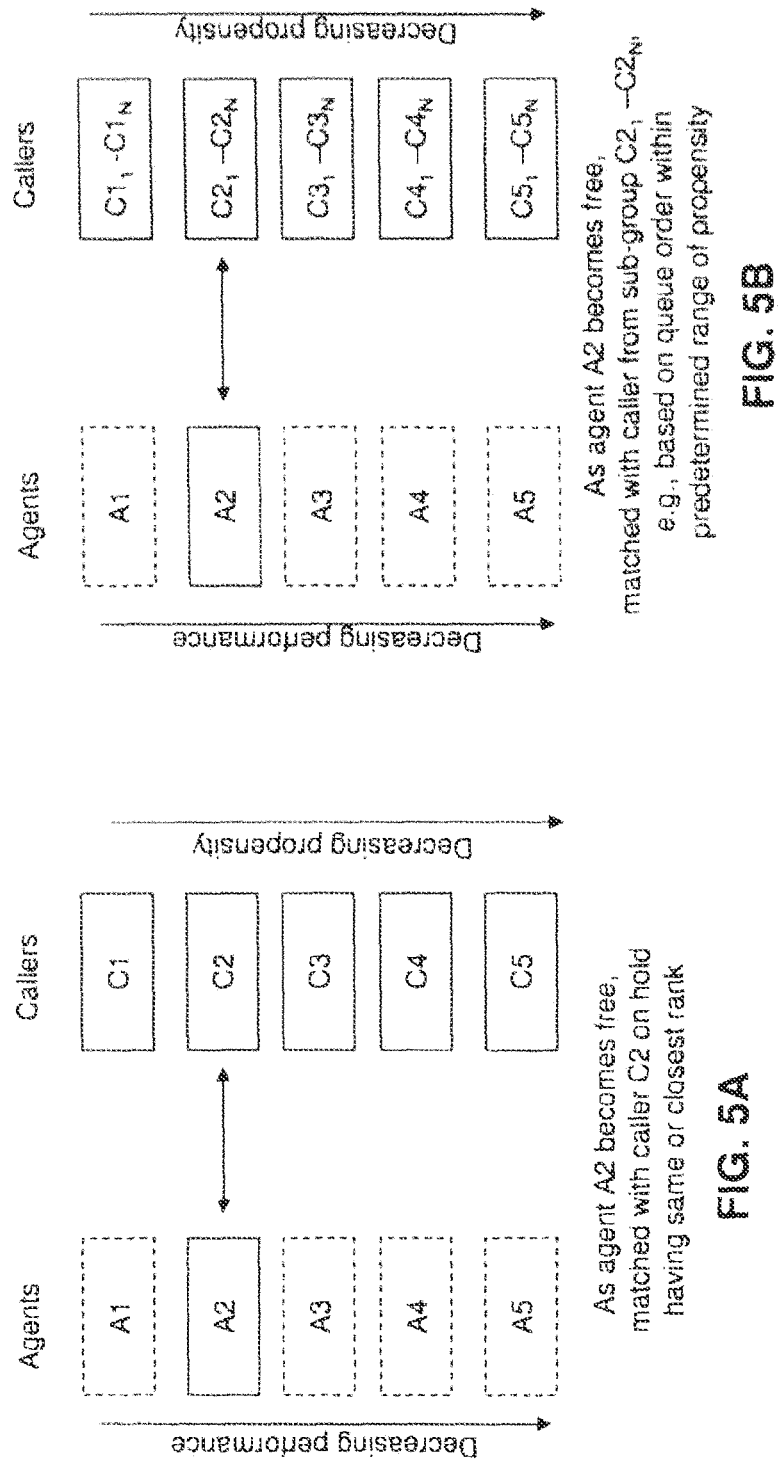

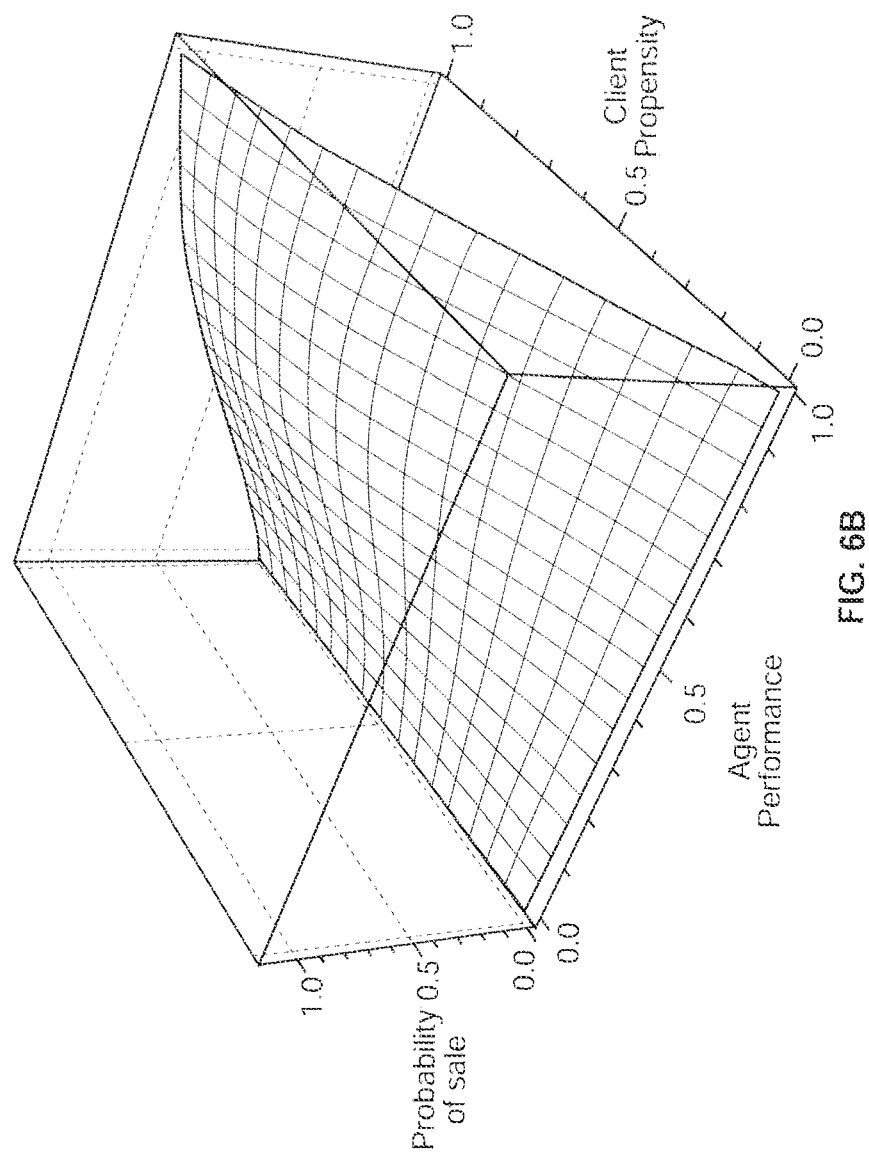

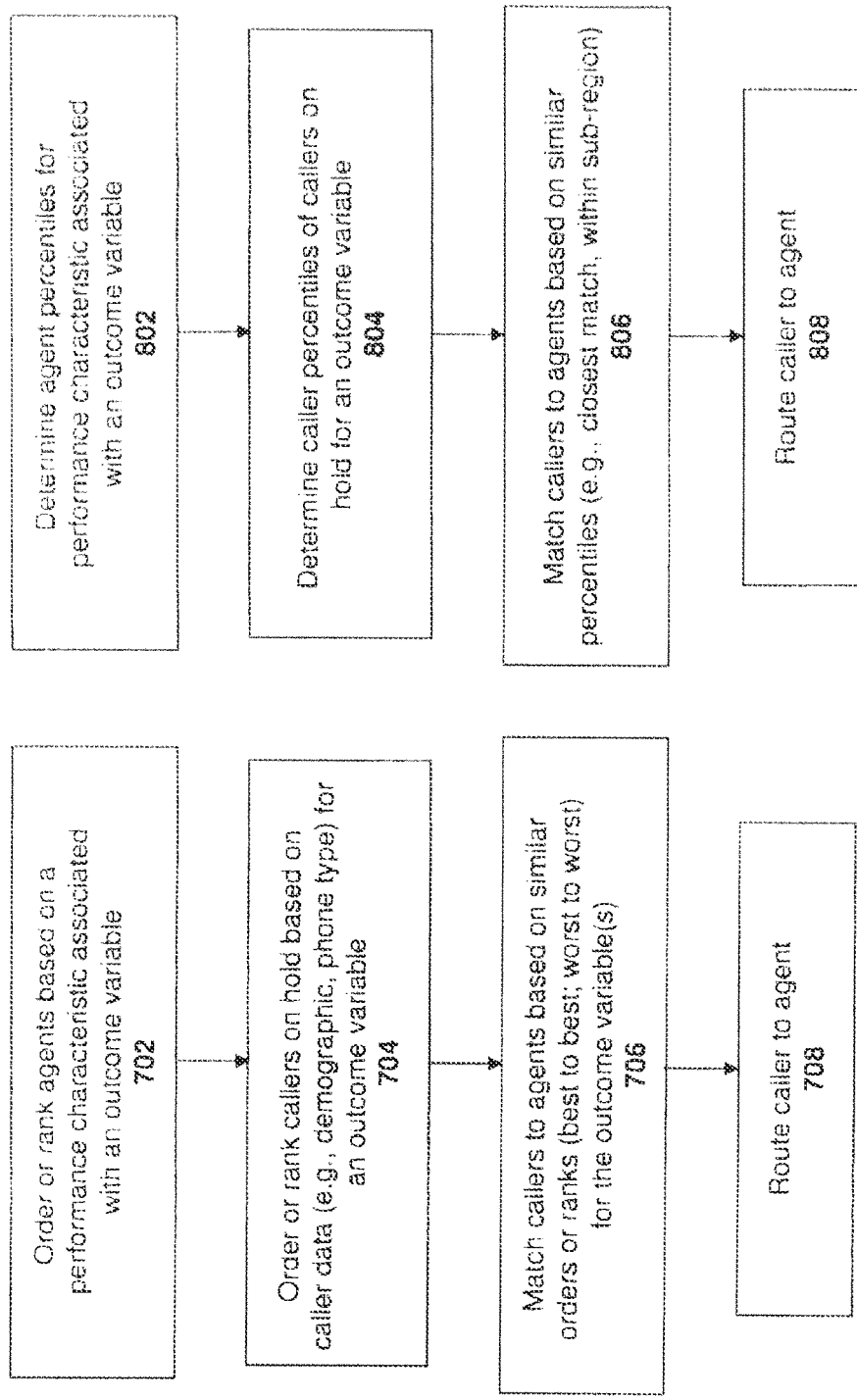

CALL MAPPING SYSTEMS AND METHODS USING VARIANCE ALGORITHM (VA) AND/OR DISTRIBUTION COMPENSATION

CROSS REFERENCE TO RELATED APPLICATIONS

This application is continuation of U.S. patent application Ser. No. 14/530,058, filed Oct. 31, 2014, which is a continuation of U.S. patent application Ser. No. 13/843,724, filed Mar. 15, 2013, now U.S. Pat. No. 8,879,715, issued Nov. 4, 2014, which claims priority to U.S. Provisional Patent Application No. 61/615,788, filed Mar. 26, 2012, U.S. Provisional Patent Application No. 61/615,779, filed Mar. 26, 2012, and U.S. Provisional Patent Application No. 61/615,772, filed Mar. 26, 2012, each of which is hereby incorporated herein by reference in its entirety as if fully set forth herein.

BACKGROUND

The present invention relates generally to the field of routing phone calls and other telecommunications in a contact center system.

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller." The individuals employed by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion.

BRIEF SUMMARY OF THE EMBODIMENTS

Embodiments of a method are disclosed a method is disclosed comprising: obtaining, by one or more computers, agent performance data for a set of agents; ranking, by the one or more computers, the agents based at least in part on the agent performance data; dividing, by the one or more computers, the agents into agent performance ranges based at least in part on the ranking step; partitioning, by the one or more computers, callers in a set of callers based on one or more criteria into a set of partitions; determining for each of the partitions, by the one or more computers, an outcome value at least for a first one of the agent performance ranges and for a second one of the agent performance ranges; calculating, by the one or more computers, for each of the partitions an outcome value difference indicator based at least in part on a difference between the outcome value for the first agent performance range and the outcome value for the second agent performance range; and matching, by the one or more computers, a respective agent with respective performance data to a respective caller in one of the partitions, based at least in part on the outcome value difference indicators for the partitions.

In embodiments, the determining an outcome value step may comprise determining a mean outcome value for a particular outcome for the agent performance range.

In embodiments, the partition may be based at least in part on one or more selected from the group of demographic data, area code, zip code, NPANXX, VTN, geographic area, 800 number, and transfer number.

In embodiments, the outcome value comprises one or more selected from the group of sale, number of items sold per call, and revenue per call coupled with handle time.

In embodiments, the matching step may be based at least in part on a rule to assign a higher performing agent to a caller from one of the partitions where the outcome value difference indicator is higher relative to other of the outcome value difference indicators, wherein the higher performing agent is determined based at least in part on the agent performance data for the respective agent relative to the agent performance data for other of the agents.

In embodiments, the matching step may further comprise the steps: calculating, by the one or more computers, a ranking or percentile for the partitions by $\Delta$ from a high $\Delta$ to a low $\Delta$ based at least in part on a first number of calls; calculating a ranking or percentile of the agent performances, by the one or more computers, for the respective agents in the set of agents based at least in part on the respective agent performance data and a second number of calls; and matching, by the one or more computers, the respective agent to the respective caller based at least in part on a rule to minimize a difference between the partition percentile of the outcome value difference indicator for the partition of the respective caller and the performance percentile of the respective agent.

In embodiments, the matching step may be performed based at least in part using a multi-data element pattern matching algorithm in a pair-wise fashion to obtain a score or other indicator for each of multiple caller-agent pairs from a set of agents and a set of callers.

In embodiments, the method may further comprise correcting, by the one or more computers, for time effects by subtracting from agent performance data an epoch average from a desired outcome data sample, wherein the epoch average comprises an average of one selected from the group of hour-of-day desired outcome data, day-of-week desired outcome data, and hour-of-week desired outcome data, from an epoch in which a respective call occurs, to obtain a new target outcome variable.

In embodiments, the method may further comprise correcting, by the one or more computers, for time effects by dividing agent performance data by an epoch average from a desired outcome data sample, wherein the epoch average comprises an average of one selected from the group of hour-of-day desired outcome data, day-of-week desired outcome data, and hour-of-week desired outcome data from an epoch in which a respective call occurs, to obtain a new target outcome variable.

In embodiments, the method may further comprise correcting, by the one or more computers, for time effects by forming an outer product by combining hour-of-day desired outcome data, day-of-week desired outcome data, and hour-of-week desired outcome data from an epoch in which a respective call occurs to obtain a time effects factor; and calculating, by the one or more computers, the agent performance using the time effects factor in a Bayesian Mean Regression calculation of the agent performance.

In embodiments, the method may further comprise: switching, by the one or more computers, between the outcome value difference indicator matching algorithm and a second matching algorithm that is different from the outcome value difference indicator matching algorithm, based on one or more criteria; and when there has been switching to the second matching algorithm, then performing, by the one or more computers, performing the second matching algorithm to match a respective one of the agents with a respective one of the callers.

In embodiments, the method may further comprise: obtaining results data, by the one or more computers, using each of the outcome value difference indicator matching algorithm and the second matching algorithm in the matching step; determining a switch-over point in the distribution for agent performance and/or the distribution for caller propensity where better results are obtained from one of the algorithms relative to the other of the algorithms; and using, by the one or more computers, this switch-over point to switch between the algorithms.

In embodiments, the method may further comprise: switching, by the one or more computers, between the outcome value difference indicator matching algorithm and a second matching algorithm configured to match a respective agent with a respective ranking or percentile to a caller in one of the partitions with a closest ranking or percentile, based on one or more criteria; and when there has been switching to the second matching algorithm, then performing, by the one or more computers, performing the second matching algorithm to match a respective one of the agents with a respective one of the callers.

In embodiments, a system is disclosed, comprising: one or more computers, configured with program code, that when executed, perform the steps: obtaining, by the one or more computers, agent performance data for a set of agents; ranking, by the one or more computers, the agents based at least in part on the agent performance data; dividing, by the one or more computers, the agents into agent performance ranges based at least in part on the ranking step; partitioning, by the one or more computers, callers in a set of callers based on one or more criteria into a set of partitions; determining for each of the partitions, by the one or more computers, an outcome value at least for a first one of the agent performance ranges and for a second one of the agent performance ranges; calculating, by the one or more computers, for each of the partitions an outcome value difference indicator based at least in part on a difference between the outcome value for the first agent performance range and the outcome value for the second agent performance range; and matching, by the one or more computers, a respective agent with respective performance data to a respective caller in one of the partitions, based at least in part on the outcome value difference indicators for the partitions.

In embodiments, a program product is disclosed, comprising: a non-transitory computer-readable medium configured with program code, that when executed by one or more computers, causes the performance of the steps: obtaining, by the one or more computers, agent performance data for a set of agents; ranking, by the one or more computers, the agents based at least in part on the agent performance data; dividing, by the one or more computers, the agents into agent performance ranges based at least in part on the ranking step; partitioning, by the one or more computers, callers in a set of callers based on one or more criteria into a set of partitions; determining for each of the partitions, by the one or more computers, an outcome value at least for a first one of the agent performance ranges and for a second one of the agent performance ranges; calculating, by the one or more computers, for each of the partitions an outcome value difference indicator based at least in part on a difference between the outcome value for the first agent performance range and the outcome value for the second agent performance range; and matching, by the one or more computers, a respective agent with respective performance data to a respective caller in one of the partitions, based at least in part on the outcome value difference indicators for the partitions.

The exemplary processes may further include or be supplemented by a pattern matching algorithm. For example, a pattern matching algorithm may use demographic data of the agents and/or callers to predict a chance of one or more outcome variables based on historical caller-agent pairings. The comparison via a pattern matching algorithm may be combined with the matching via corresponding agent performance and propensity of callers to determine a caller-agent match and routing decision.

Agent data may include agent grades or rankings, agent historical data, agent demographic data, agent psychographic data, and other business-relevant data about the agent (individually or collectively referred to in this application as "agent data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences. It is further noted that certain data, such an area code, may provide statistical data regarding probable income level, education level, ethnicity, religion, and so on, of a caller which may be used by the exemplary process to determine a propensity of caller for a particular outcome variable, for example.

The examples can be applied broadly to different processes for matching callers and agents. For instance, exemplary processes or models may include conventional queue routing, performance based matching (e.g., ranking a set of agents based on performance and preferentially matching callers to the agents based on a performance ranking or score), an adaptive pattern matching algorithm or computer model for matching callers to agents (e.g., comparing caller data associated with a caller to agent data associated with a set of agents), affinity data matching, combinations thereof, and so on. The methods may therefore operate to output scores or rankings of the callers, agents, and/or caller-agent pairs for a desired optimization of an outcome variable (e.g., for optimizing cost, revenue, customer satisfaction, and so on). In one example, different models may be used for matching callers to agents and combined in some fashion with the exemplary multiplier processes, e.g., linearly weighted and combined for different performance outcome variables (e.g., cost, revenue, customer satisfaction, and so on).

According to another aspect, computer-readable storage media and apparatuses are provided for mapping and routing callers to agents according to the various processes described herein. Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

BRIEF DESCRIPTION OF THE DRAWINGS

FIGS. 5A and 5B illustrate exemplary probability matching processes for matching a caller to an agent.

FIGS. 6A and 6B illustrate exemplary three-dimensional plots of agent performance, client propensity, and the probability of a sale for particular caller-agent pairings.

FIG. 7 illustrates an exemplary probability matching process or computer model for matching callers to agents based on probabilities of outcome variables.

FIG. 8 illustrates an exemplary probability matching process or computer model for matching callers to agents based on probabilities of outcome variables.

DETAILED DESCRIPTION OF EMBODIMENTS

Figure 1:
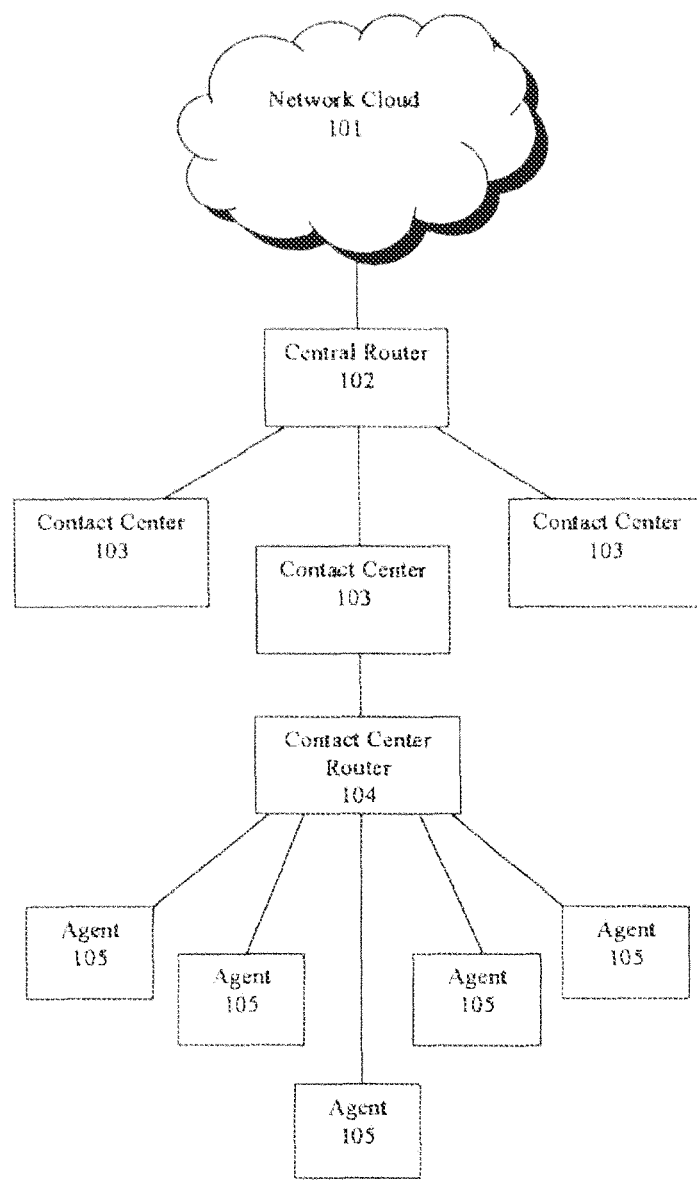
FIG. 1 is a diagram reflecting the general setup of a contact center and its operation.

Exemplary call mapping and routing systems and methods are described, for example, in U.S. patent application Ser. No. 12/267,471, entitled "Routing Callers to Agents Based on Time Effect Data," filed on Nov. 7, 2008; U.S. patent application Ser. No. 12/490,949, entitled "Probability Multiplier Process for Call Center Routing," filed on Jun. 24, 2009; U.S. patent application Ser. No. 12/266,418, entitled, "Pooling Callers for Matching to Agents Based on Pattern Matching Algorithms," filed on Nov. 6, 2008; U.S. patent application Ser. No. 12/051,251, filed on Jan. 28, 2008; U.S. patent application Ser. No. 12/267,471, filed on Jan. 28, 2010; and U.S. Provisional Patent Application No. 61/084,201, filed Jul. 28, 2008, all of which are incorporated herein by reference in their entirety.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

According to certain aspects of the present invention, systems. and methods are provided for matching callers to agents within a call routing center based on similar rankings or relative probabilities for a desired outcome variable. In one example, an exemplary probability multiplier process include matching the best agents to the best callers, the worst agents to worst callers, and so on, based on the probability of a desired outcome variable. For instance, agents may be scored or ranked based on performance for an outcome variable such as sales, customer satisfaction, cost, or the like. Additionally, callers can be scored or ranked for an outcome variable such as propensity or statistical chance to purchase (which may be based on available caller data, e.g., phone number, area code, zip code, demographic data, type of phone used, historical data, and so on). Callers and agents can then be matched according to their respective rank or percentile rank; for example, the highest ranking agent matched with the highest ranking caller, the second highest ranked agent with the second highest caller, and so on.

The exemplary probability multiplier process takes advantage of the inherent geometric relationship of multiplying the different probabilities, for example, a 30% sales rate agent with a 30% buying customer (giving you a total chance of 9%) as opposed to matching a 20% or 10% sales rate agent with that same customer (resulting in a 6% or 3% chance). When used across all agents and callers, the process results in a higher overall predicted chance of a particular outcome variable, such as sales, than a random matching process.

In one example, in addition to using relative ranks of agents and callers to match callers to agents, a pattern matching algorithm using agent and/or caller demographic data may be used. For instance, agents and callers may be matched based on demographic data via a pattern matching algorithm, such as an adaptive correlation algorithm. The caller-agent matches from the probability multiplier algorithm and pattern matching algorithms can be combined, e.g., linearly combined with or without weightings, to determine a final match for routing a caller to an agent.

Initially, exemplary call routing systems and methods are described for matching callers to available agents. This description is followed by exemplary systems and methods for ranking or ordering callers and agents based on an outcome variable, e.g., sales, customer satisfactions, or the like, and matching agents to callers based on the relative rankings. For instance, matching the highest ranking agent for a particular outcome variable with the highest ranking caller for a particular outcome variable, matching the lowest ranking agent with the lowest ranking caller, and so on.

FIG. 1 is a diagram reflecting the general setup of a typical contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contact addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103.

Figure 2:
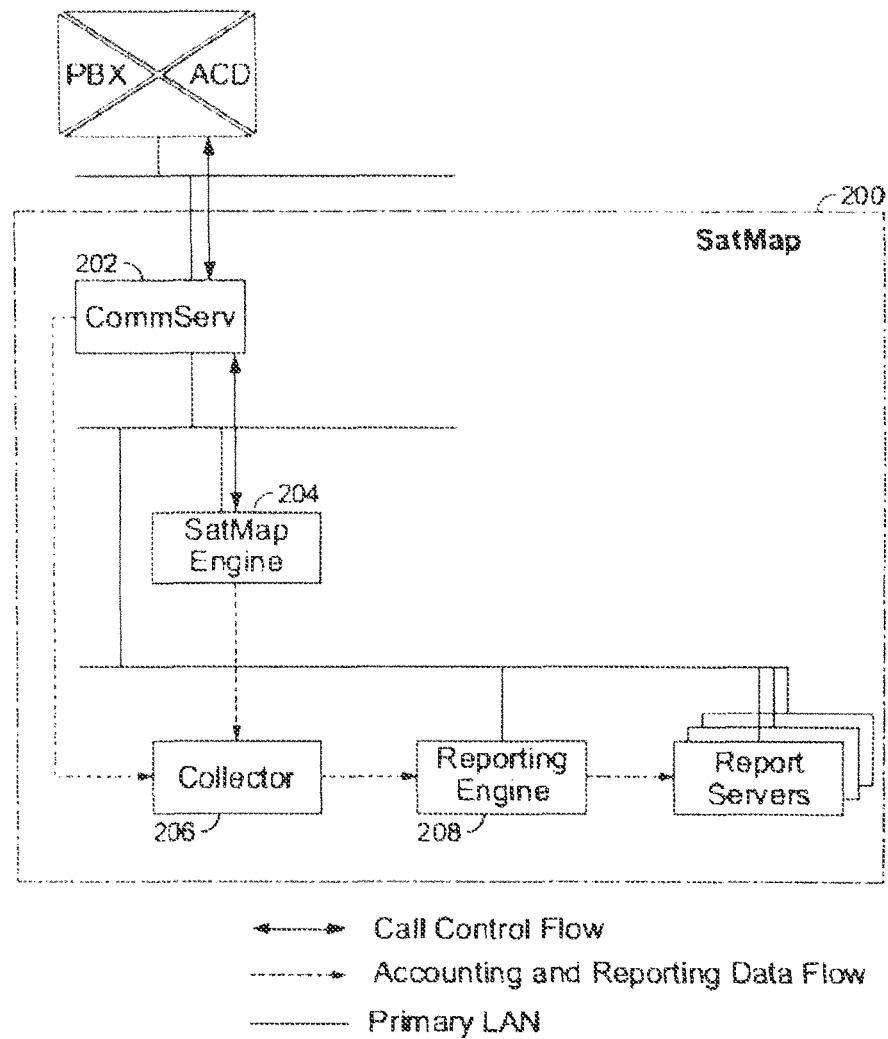
FIG. 2 illustrates an exemplary routing system having a routing engine for routing callers based on performance and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part and in one example, on a probability multiplier process based on agent performance and caller propensity (e.g., statistical chance or likelihood) for a particular outcome variable. Routing system 200 may further be operable to match callers based on pattern matching algorithms using caller data and/or agent data alone or in combination with the probability multiplier process. Routing system 200 may include a communication server 202 and a routing engine 204 for receiving and matching callers to agents (referred to at times as "mapping" callers to agents).

In one example, and as described in greater detail below, routing engine 204 is operable to determine or retrieve performance data for available agents and caller propensity for an outcome variable from callers on hold. The performance data and caller propensity data may be converted to percentile ranks for each and used to match callers to agents based on the closest match of percentile ranks, respectively, thereby resulting in high performing agents matched to callers with a high propensity to purchase, for example.

Additionally, in some examples, routing engine 204 may additionally include pattern matching algorithms and/or computer models, which may adapt over time based on the performance or outcomes of previous caller-agent matches. The additional pattern matching algorithms may be combined in various fashions with a probability multiplier process to determine a routing decision. In one example, a pattern matching algorithm may include a neural network based adaptive pattern matching engine as is known in the art; for example, a resilient backpropagation (RProp) algorithm, as described by M. Riedmiller, H. Braun: "A Direct Adaptive Method for Faster backpropagation Learning: The RPROP Algorithm," Proc. of the IEEE Intl. Conf. on Neural Networks 1993, which is incorporated by reference herein in its entirety. Various other exemplary agent performance and pattern matching algorithms and computer model systems and processes which may be included with contact routing system and/or routing engine 204 are described, for example, in U.S. patent application Ser. No. 12/021,251, filed Jan. 28, 2008, and U.S. patent application Ser. No. 12/202,091, filed Aug. 29, 2008, both of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, historical performance data of agents, and the like. Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
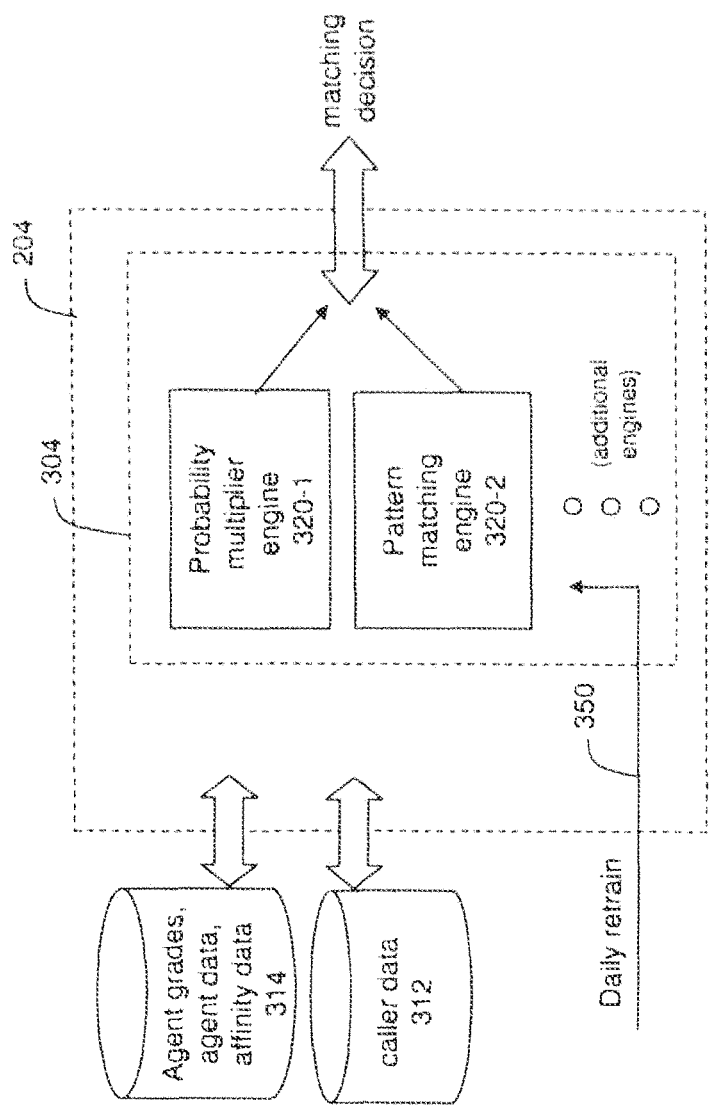
FIG. 3 illustrates an exemplary routing system having a mapping engine for matching callers to agents based on a probability multiplier process alone or in combination with one or more additional matching processes.

FIG. 3 illustrates further detail of exemplary routing engine 204. Routing engine 204 includes a main mapping engine 304, which may include one or more mapping engines therein for use alone or in combination with other mapping engines. In some examples, routing engine 204 may route callers based solely or in part on performance data associated with agents and caller data associated with the propensity or chances of a particular outcome variable. In other examples, routing engine 204 may further make routing decisions based solely or in part on comparing various caller data and agent data, which may include, e.g., performance based data, demographic data, psychographic data, type of phone/phone number, BTN-data, and other business-relevant data. Additionally, affinity databases (not shown) may be used and such information received by routing engine 204 and/or mapping engine 304 for making or influencing routing decisions. Database 312 may include local or remote databases, third party services, and so on (additionally, mapping engine 304 may receive agent data from database 314 if applicable for the particular mapping process).

In one example, relative agent performance may be determined by ranking or scoring a set of agents based on performance for a particular outcome variable (such as revenue generation, cost, customer satisfaction, combinations thereof, and the like). Further, the relative agent performance may be converted to a relative percentile ranking. Processing engine 320-1, for example, may determine or receive relative agent performance data for one or more outcome variables. Additionally, processing engine 320-1 may receive or determine a propensity of a caller for a particular outcome variable (such as propensity to purchase, length of call, to be satisfied, combinations thereof, and the like). The propensity of a caller may be determined from available caller data. The relative performance data of the agents and propensity data of the callers may then be used to match a caller and an agent based on corresponding ranking. In some examples, the performance and propensity data is converted to relative percentile rankings for the callers and agents, and matching callers and agents based on the closest respective relative percentiles.

Processing engine 320-2, in one example, includes one or more pattern matching algorithms, which operate to compare available caller data with a caller to agent data associated a set of agents and determine a suitability score of each caller-agent pair. Processing engine 320-2 may receive caller data and agent data from various databases (e.g., 312 and 314) and output caller-agent pair scores or a ranking of caller-agent pairs, for example. The pattern matching algorithm may include a correlation algorithm such as a neural network algorithm, genetic algorithm, or other adaptive algorithm(s).

Additionally, a processing engine may include one or more affinity matching algorithms, which operate to receive affinity data associated with the callers and/or agents. Affinity data and/or affinity matching algorithms may be used alone or in combination with other processes or models discussed herein.

Routing engine 204 may further include selection logic (not shown) for selecting and/or weighting one or more of the plurality of processing engines 320-1 and 320-2 for mapping a caller to an agent. For example, selection logic may include rules for determining the type and amount of caller data that is known or available and selecting an appropriate processing engine 320-1, 320-2, etc., or combinations thereof. Selection logic may be included in whole or in part with routing engine 204, mapping engine 304, or remotely to both.

Further, as indicated in FIG. 3 at 350, call history data (including, e.g., caller-agent pair data and outcomes with respect to cost, revenue, customer satisfaction, and so on) may be used to retrain or modify processing engines 320-1 and 320-2. For instance, the agent performance data may be updated periodically (e.g., daily) based on historical outcomes to re-rank the agents. Further, historical information regarding callers may be used to update information regarding caller propensities for particular outcome variables.

In some examples, routing engine 204 or main mapping engine 304 may further include a conventional queue based routing processes, which may store or access hold or idle times of callers and agents, and operate to map callers to agents based on a hold time or queue order of the callers (and/or agents). Further, various function or time limits may be applied to callers on hold to ensure that callers are not held too long awaiting an agent. For instance, if a caller's time limit (whether based on a predetermined value or function related to the caller) is exceeded the caller can be routed to the next available agent.

Additionally, an interface may be presented to a user allowing for adjustment of various aspects of the exemplary systems and methods, for example, allowing adjustments of the number of different models, degrees, and types of caller data. Further, an interface may allow for the adjustment of the particular models used for different degrees or types, for example, adjusting an optimization or weighting of a particular model, changing a model for a particular degree or type of caller data, and so on. The interface may include a slider or selector for adjusting different factors in real-time or at a predetermined time. Additionally, the interface may allow a user to turn certain methods on and off, and may display an estimated effect of changes. For instance, an interface may display the probable change in one or more of cost, revenue generation, or customer satisfaction by changing aspects of the routing system. Various estimation methods and algorithms for estimating outcome variables are described, for example, in U.S. Provisional Patent Application No. 61/084,201, filed on Jul. 28, 2008, and which is incorporated herein by reference in its entirety. In one example, the estimate includes evaluating a past time period of the same (or similar) set of agents and constructing a distribution of agent/caller pairs. Using each pair, an expected success rate can be computed via the performance based matching, pattern matching algorithm, etc., and applied to current information to estimate current performance (e.g., with respect to one or more of sales, cost, customer satisfaction, etc.). Accordingly, taking historical call data and agent information the system can compute estimates of changing the balance or weighting of the processing methods. It is noted that a comparable time (e.g., time of day, day of the week etc.) for the historical information may be important as performance will likely vary with time.

Figure 4B:
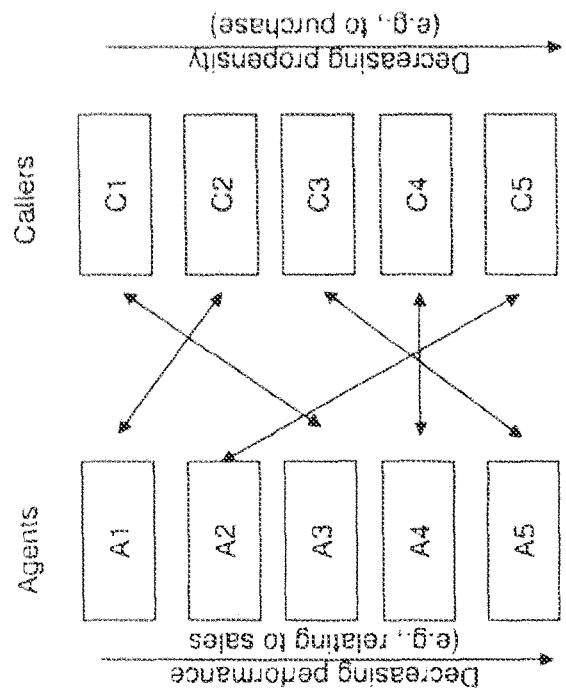
FIGS. 4A and 4B illustrate an exemplary probability matching process and random matching process, respectively.
Figure 4A:
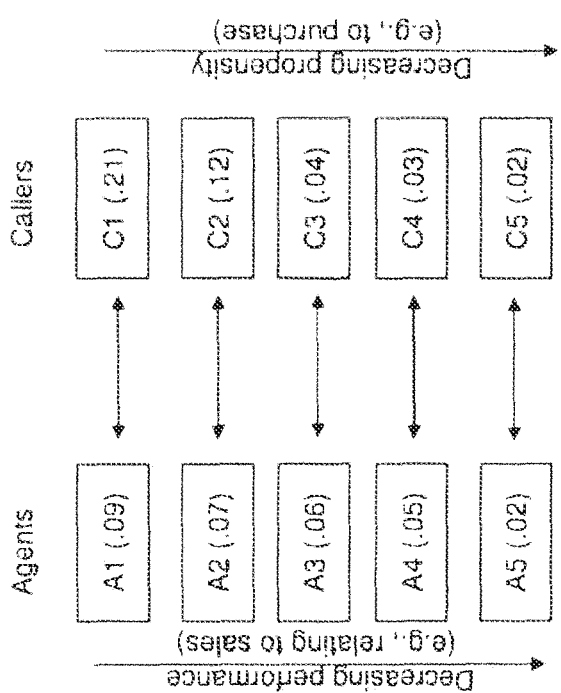

FIG. 4A schematically illustrates an exemplary probability multiplier process for matching callers and agents and FIG. 4B illustrates a random matching process (e.g., queue based or the like). These illustrative examples assume that there are five agents and five callers to be matched. The agents can be ranked based on performance of a desired outcome variable. For instance, the agents may be scored and ordered based on a statistical chance of completing a sale based on historical sales rate data. Additionally, the callers can be scored and ranked based on a desired outcome variable, for example, on a propensity or likelihood to purchase products or services. The callers may be ranked and ordered based on known or available caller data including, for example, demographic data, zip codes, area codes, type of phone used, and so on, which are used to determine a statistical or historical chance of the caller making a purchase.

The agents and callers are then matched to each other based on the ranking, where the highest ranked agent is matched to the highest ranked caller, the second highest ranked agent matched to the second highest ranked caller, and so on. Matching the best to the best and worst to the worst results in an increase product of the matched pairs compared to randomly matching callers to agents as shown in FIG. 4B. For instance, using illustrative sales rates for agents A1-A5 (e.g., based on past agent performance) and the chance of callers C1-C5 making a purchase (e.g., based on caller data such as demographic data, caller data, and so on), the product of the matches shown in FIG. 4A is as follows:

$$(0.09*0.21)+(0.07*0.12)+(0.06*0.04)+(0.05*0.03)+ (0.02*0.02)0.0316$$

In contrast, for a random matching, as illustrated in FIG. 4B and using the same percentages, the product is as follows:

$$(0.09*0.12)+(0.07*0.02)+(0.06*0.21)+(0.05*0.03)+ (0.02*0.04)0.0271$$

Accordingly, matching the highest ranking agent with the highest ranking caller and the worst ranking agent with the worst ranking caller increases the overall product, and thus chances of optimizing the desired outcome variable (e.g., sales).

FIG. 5A schematically illustrates an exemplary process for matching callers on hold to an agent that becomes free. In this example, all agents A1-A5 on duty or all that might become free within a reasonable hold time of callers C1-C5 are scored or ranked as previously described. Additionally, callers C1-C5 are scored or ranked as previously described. As an agent, e.g., agent A2 becomes free the process determines that caller C2 is the same (or similar) rank as agent A2 and caller C2 is matched thereto. The remaining callers on hold may then be re-ranked for matching when the next agent becomes free. Additionally, as new callers are placed on hold the callers can be reranked in a real-time fashion. The exemplary process operates in a similar fashion for multiple free agents and a caller becomes free (both for inbound and outbound call centers).

It will be recognized that in most instances the number of agents and callers will not be equal. Accordingly, the callers (and/or agents) can be ranked and converted to relative percentile rankings for the callers; for example, a normalized ranking or setting the highest ranked caller as the $100^{th}$ percentile and the lowest ranked caller as the $0^{th}$ percentile. The agents may be similarly converted to relative percentile rankings. As an agent becomes free, the agent may be matched to the caller having the closest relative percentile rank to the agent's relative percentile rank. In other examples, as an agent becomes free the agent can be compared to the ranking of at least a portion of callers on hold to compute Z-scores for each agent-caller pair. The highest Z-score may correspond to the smallest difference in relative percentile rankings. Further, as noted herein, the Zscores may be used to combine the matching with other algorithms such as pattern matching algorithms, which may also output a Z-score.

FIG. 5B schematically illustrates exemplary methods for matching callers and agents when an agent becomes free and multiple callers are on hold. In this example, the callers (and in some examples the agents) are grouped in sub-groups of performance. For instance, a range of caller performance may be divided into multiple sub-groups and callers bucketed within each group. The top 20% of callers by performance might be grouped together as $C1_1$-$C1_N$ as illustrated, followed by the next 20%, and so on. As an agent becomes free, e.g., A2, a caller from an appropriate sub-group is matched to the caller, in this example from $C2_1$-$C2_N$. Within the sub-group the caller may be chosen by a queue order, best-match, a pattern matching algorithm, or the like. The appropriate sub-group from which to route a caller may be determined based on the agent ranking or score, for example.

In one example, suppose it is desired to optimize a call center performance for Outcome variable O. O can include one or more of sales rate, customer satisfaction, first call resolution, or other variables. Suppose further that at some time there are $N_A$ agents logged in and $N_c$ callers in queue. Suppose that agents have performances in generating O of $$A_i^o\, i=1,\ldots,N_A$$

and callers, partitioned by some property P, have a propensity to O of $$C_i^o\, i=1,\ldots,N_c$$

For example, in the case where O is sales rate and P is caller area code, $A^O$ is each agent's sales rate and $C^O$ is the sales rate for callers in a particular area code. Calculating the percentile ranked agent performances (with respect to the set of logged in agents) and the percentile ranked caller propensities (with respect to the set of callers in queue at some instant of time) as follows:

$$A_{Pi}^O = pr(A_i^O, A^O)(i=1,\ldots,N_A)$$

$$C_{Pi}^O = pr(C_i^O, C^O)(i=1,\ldots,N_c)$$

where pr(a, B) is the percentile rank function which returns the rank of value a with respect to the set of values B scaled into the range [0,100].

Suppose that all the agents are on calls when the k'th agent becomes available. Then to determine which caller in the queue they should be connected to, compute the difference between the percentile ranks of the newly free k'th agent and those of the callers in queue:

$$D_j = A_{Pk}^O - C_{Pj}^O (j=1,\ldots,N_c)$$

The value of j indexing the minimum element of the set $\{D_j\}$ gives the member of the queue to connect to the k'th agent. A Z-score can also be derived from the $D_j$. This has the advantages that the highest value agent-caller pairing is the best fit of the set and that the output from this algorithm can be combined with Z-score outputs from other algorithms since they have the same scale.

$$Z_j = (T_j - \mu)/\sigma$$

where $\mu$ and $\sigma$ and the mean and standard deviation of T which is given by:

$$T_j = \mathrm{Min}(D_j) - D_j$$

It will be recognized by those of skill in the art that the above example and algorithm described for the case of two variables is not restricted to the case of two variables, but can be extended in an obvious way to the case of more than two variables which are monotonically related to the desired outcome. Furthermore the increase in call center performance can be shown to increase with more variables, as will be understood and contemplated by those of ordinary skill in the art.

Figure 6A:
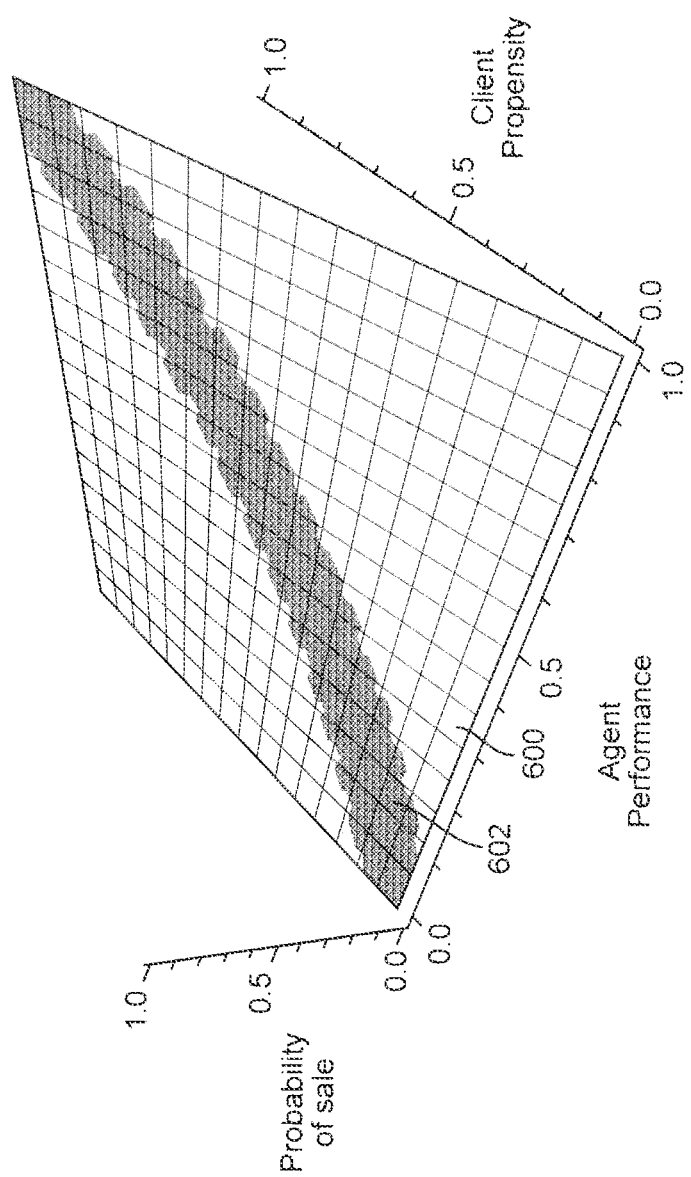

FIG. 6A illustrates an exemplary three-dimensional plot of agent performance versus caller propensity along the x-axis and y-axis and the probability of a sale along the z-axis. In this example, agent performance and caller propensity are defined as linear functions of x and y. For instance, without loss of generality, $x\varepsilon[0,1]$ and $y\varepsilon[0,1]$, such that the agent propensity is:

$$a = ca + ma\, x$$

where "ca" and "ma" represent the intercept and slope for the agent performance linear function (note that in certain instances herein, multiple letters represent a single variable e.g., "ca" and "ma" are each single variables, and are offset by other letters to indicate a multiplication operator). Similarly for the caller propensity:

$$c = cc + mc\, y$$

where "cc" and "mc" represent the intercept and slope for the caller propensity linear function. The multiplicative model probability of sale p of the product of a and c is:

$$p = a\, c$$

The average height d of a surface of the probability of a sale, which is graphically illustrated in FIG. 6A as surface 600, can be computed as follows:

$$d = \int_0^1 \int_0^1 p\, dx dy = \frac{1}{4}(2ca + ma)(2cc + mc)$$

Determining the average height n of the diagonal of the surface height "pdiag" (a single variable), which corresponds to multiplying similar percentile ranking agents against callers is as follows:

$$pdiag = (ca + ma\lambda)(cc + mc\lambda);$$

$$n = \int_0^1 pdiag\, d\lambda = cacc + \frac{camc}{2} + \frac{ccma}{2} + \frac{mamc}{3}$$

where $\lambda$ parameterizes the diagonal function so one can integrate down the line.

The boost b, or the potential increase in performance or sales rate according to the probability matching by corresponding rates, as illustrated by the diagonal shaded band 602 on surface 600, can be computed as follows:

$$b = n/d - 1 = \frac{4\left(cacc + \frac{camc}{2} + \frac{ccma}{2} + \frac{mamc}{3}\right)}{(2ca + ma)(2cc + mc)} - 1$$

where the theoretical maximum boost of matching according to probability, for this illustrative example, is ⅓. Accordingly, matching callers to agents on or near diagonal shaded band 602 increases the probability of sales.

FIG. 6B illustrates an exemplary analysis and plot for normal distribution of callers and agents for agent performance and caller propensity (as opposed to a uniform distribution of performance). Assuming the same definitions of agent performance and caller propensity, a two dimensional Gaussian function can be used to represent the distribution of call frequencies across the agents' performance and callers' propensities:

$$g2d(x, y, x0, y0, \sigma) = e^{\frac{-(x-x0)^2-(y-y0)^2}{2\sigma^2}}$$

The sales rate can then be represented by a function of a and c, where A and $\sigma$ give the amplitude and standard deviation of the Gaussian component respectively. Assuming that the Gaussian is centered at $\{0.5, 0.5\}$, the probability can be written as:

$$p = ac\left(1 + Ag2d\left(x, y, \frac{1}{2}, \frac{1}{2}, \sigma\right)\right) = $$

$$(ca + \max)(cc + mcy)\left(Ae^{\frac{-(x-\frac{1}{2})^2-(y-\frac{1}{2})^2}{2\sigma^2}} + 1\right)$$

The diagonal sales rate, d, can then be determined directly from the sales rate as:

$$d(x, ca, ma, cc, mc, \sigma, x) = \left(Ae^{-\frac{(x-\frac{1}{2})^2}{\sigma^2}} + 1\right)(ca + \max)(cc + mcx)$$

Integrating this with respect to x over [0,1] gives the sales rate for call agent pairs occurring on the diagonal giving:

$$\frac{1}{12}e^{-\frac{1}{4\sigma^2}}\left(e^{\frac{1}{4\sigma^2}}\left(3\sqrt{\pi}\,A\sigma\mathrm{erf}\left(\frac{1}{2\sigma}\right)((2ca + ma)(2cc + mc) + 2mamc\sigma^2) + \right.\right.$$
$$\left.\left. 6ca(2cc + mc) + 6ccma + 4mamc\right) - 6Amamc\sigma^2\right)$$

The sales rate for random client agent pairings can be computed as: totalsalesrate[ca_, ma_, cc_, mc_, $\sigma$_, A_]=$\int_0\int_0$ salesrate[x, y, ca, ma, cc, mc, $\sigma$, A]dxdy which expands to:

$$\frac{1}{4}(2ca + ma)(2cc + mc)\left(2\pi A\sigma^2\mathrm{erf}\left(\frac{1}{2\sqrt{2}\,\sigma}\right)^2 + 1\right)$$

and the boost of the algorithm can be computed as follows:

normalboost[ca_,ma_,cc_,mc_,$\sigma$_,A_]=diagintegral
[ca,ma,cc,mc,$\sigma$,A]/totalsalesrate[ca,ma,cc,mc,$\sigma$,
A]-1 which results in a boast in sales of:

$$\frac{e^{-\frac{1}{4\sigma^2}}\left(e^{\frac{1}{4\sigma^2}}\left(3\sqrt{\pi}\,A\sigma\mathrm{erf}\left(\frac{1}{2\sigma}\right)\binom{(2ca+ma)(2cc+mc)+}{2mamc\sigma^2} + 6ca(2cc+mc)+6ccma+4mamc\right) - 6Amamc\sigma^2\right)}{3(ca+ma)(2cc+mc)\left(2\pi A\sigma^2\mathrm{erf}\left(\frac{1}{2\sqrt{2}\,\sigma}\right)^2 + 1\right)}$$

Accordingly, and similar to the normal distribution of FIG. 6A, matching callers to agents on or near diagonal shaded band 602 increases the probability of sales. Of course, it will be understood that the exemplary functions, assumptions, and distributions of caller performance and agent propensity are illustrative, and will vary based on, e.g., historical data, feedback, and the like. Further, additional considerations and variables may be incorporated into the general processes. Note also that while referring to Sales as the variable to optimize in the above example, the same procedure can be applied to other variables or combinations thereof which are to be optimized such as call handle time (e.g. cost), or first call resolution, or many others.

To the extent that there is a discrepancy in any of the foregoing equations as compared to U.S. patent application Ser. No. 12/490,949, the equations of U.S. patent application Ser. No. 12/490,949 are the correct equations and take precedence. FIG. 7 illustrates an exemplary process for matching callers to agents within a call routing center. In this example, agents are ranked based on a performance characteristic associated with an outcome variable such as sales or customer satisfaction at 702. In some examples agent performance may be determined for each agent from historical data over a period of time. In other examples, the method may merely retrieve or receive agent performance data or agent ranking for the agents.

In one example, agents are graded on an optimal interaction, such as increasing revenue, decreasing costs, or increasing customer satisfaction. Grading can be accomplished by collating the performance of a contact center agent over a period of time on their ability to achieve an optimal interaction, such as a period of at least 10 days. However, the period of time can be as short as the immediately prior contact to a period extending as long as the agent's first interaction with a caller. Moreover, the method of grading agents can be as simple as ranking each agent on a scale of 1 to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods may be used.

Callers are ranked or scored based on an outcome variable based on caller data at 704. Callers may be ranked or scored based on a predicted chance of a particular outcome based on known or available caller data. The amount and type of caller data may vary for each caller but can be used to determine a statistical chance for a particular outcome based on historical outcomes. For instance, the only data known for a caller might be an area code, which is associated with a particular propensity to purchase based on past interactions with callers from the particular area code. In some examples, there may be no data associated with the caller, in which case an average propensity or statistical chance for the particular outcome when no data is known may be used.

Callers and agents are then matched based on their respective rankings at 706. For example, matching the better agents to the better callers and so on as described. Additionally, to account for an uneven number of callers and agents either or both rankings can be adjusted or normalized and the callers and agents routed based on a closest match. For instance, the rank of an agent may be divided by the number of agents, and similarly for the callers, and the callers matched to agents based on a closest match (or within a certain range). The process may then route, or cause the routing, of the caller to the agent at 708. In other examples, the process may pass the match on to other apparatuses or processes that may use the match in other processes or use to weight with other routing processes.

FIG. 8 illustrates another exemplary process for matching callers to agents within a call routing center. In this example, agents are ranked based on a performance characteristic associated with an outcome variable such as sales or customer satisfaction and converted to a relative percentile ranking at 702. For example, the raw performance values of the agents can be converted into a relative percentile ranking; for example, a 9% sales rate might be converted to an 85% performance ranking. In other examples, the raw performance values can be converted to a standardized score or Z-score.

Callers are ranked or scored based on an outcome variable based on caller data and converted to a relative percentile ranking at 804. Similar to that of the agents, raw predicted values for the callers can be converted into a percentile ranking; for example, a 20% propensity or likelihood to purchase might be converted to a 92% percentile ranking amongst callers. In other examples, the raw values can be converted to a standardized score or Z-score.

Callers and agents are then matched based on their respective relative percentile rankings at 806. For example, the relative percentile ranking of a caller can be compared to relative percentile ranking of agents and the caller matched to the closest agent available. In examples where an agent becomes free and multiple callers are on hold the agent may be matched to the closest matching caller. In other examples, a caller may be held for a predetermined time for the best matching agent to become free and then matched and routed to the closest matching agent.

It will be recognized that various other fashions of ranking callers and agents, and matching callers to agents based on their respective rankings, are contemplated. For example, generally speaking, the exemplary processes result in higher ranking callers being routed to higher ranking agents and lower ranking callers being routed to lower ranking agents.

Figure 9:
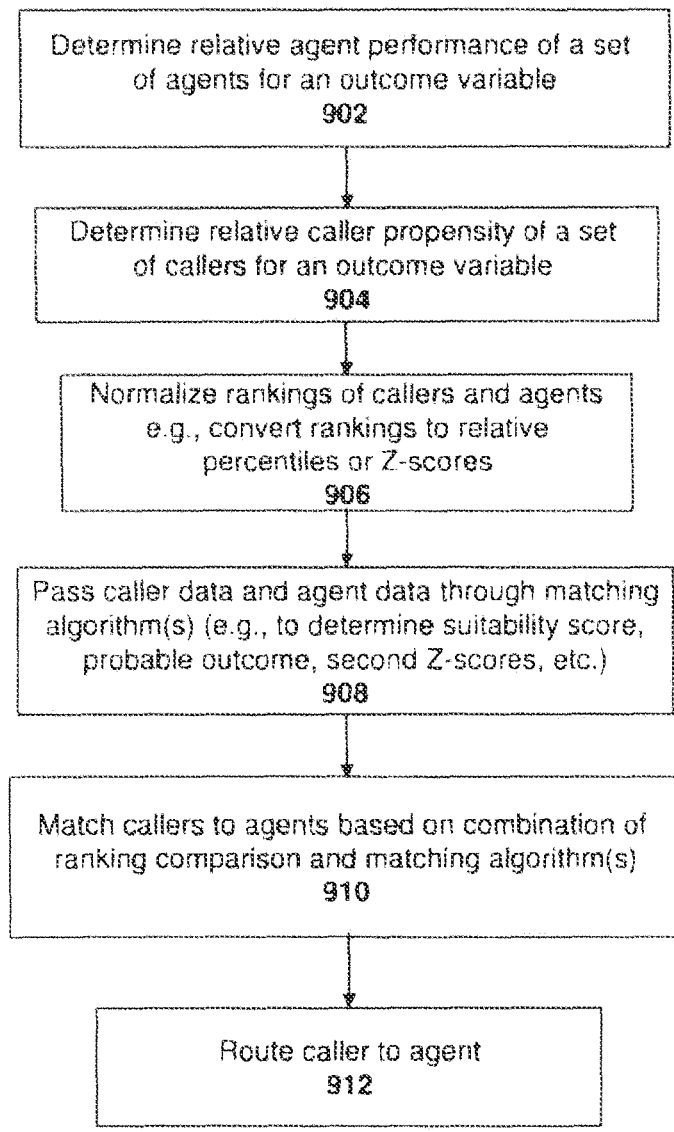
FIG. 9 illustrates an exemplary probability matching process or computer model for matching callers to agents based on probabilities of outcome variables.

FIG. 9 illustrates another exemplary process for matching callers to agents within a call routing center based on both a probability multiplier process and a pattern matching algorithm. The process includes determining relative agent performance of a set of agents for an outcome variable at 902 and determining relative caller propensity of a set of callers for the outcome variable at 904. The relative agent performance and relative caller propensity may further be normalized or converted to relative percentile rankings at 906.

A portion or all of available agent data and caller data may be passed through a pattern matching algorithm at 908. In one example, the matching algorithm includes an adaptive pattern matching algorithm such as a neural network algorithm that is trained on previous caller-agent pairing outcomes.

The matching algorithm may include comparing demographic data associated with the caller and/or agent for each caller-agent pair and computing a suitability score or ranking of caller-agent pairs for a desired outcome variable (or weighting of outcome variables). Further, a Z-score can be determined for each caller-agent pair and outcome variable(s); for instance, U.S. patent application Ser. No. 12/202,091, filed Aug. 29, 2009, describes exemplary processes for computing Z-scores for caller-agent pairs and is incorporated by reference herein in its entirety.

Exemplary pattern matching algorithms and computer models can include a correlation algorithm, such as a neural network algorithm or a genetic algorithm. In one example, a resilient backpropagation (RProp) algorithm may be used, as described by M. Riedmiller, H. Braun: "A Direct Adaptive Method for Faster backpropagation Learning: The RPROP Algorithm," Proc. of the IEEE Intl. Conf. on Neural Networks 1993, which is incorporated by reference herein in its entirety. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm can be used to create a computer model reflecting the predicted chances of an optimal interaction for each agent and caller matching. For example, the computer model may include the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, exemplary methods and systems can match every available agent with every available caller, or even a narrower subset of agents or callers. The computer model can also be further refined to comprise a suitability score for each matching of an agent and a caller.

In other examples, exemplary models or methods may utilize affinity data associated with callers and/or agents. For example, affinity data may relate to an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue; irrespective of what the matches generated using caller data and agent demographic or psychographic data may indicate.

In one example, affinity data and an affinity database developed by the described examples may be one in which a caller's contact outcomes are tracked across the various agent data. Such an analysis might indicate, for example, that the caller is most likely to be satisfied with a contact if they are matched to an agent of similar gender, race, age, or even with a specific agent. Using this example, the method could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if an exemplary method was to rely solely on commercial databases in order to match a caller and agent, it may predict that the caller would be best matched to an agent of the same gender to achieve optimal customer satisfaction. However, by including affinity database information developed from prior interactions with the caller, an exemplary method might more accurately predict that the caller would be best matched to an agent of the opposite gender to achieve optimal customer satisfaction.

Callers can then be matched to agents at 910 based on a comparison of relative rankings determined in 906 and the pattern matching algorithm at 908. For instance, outcomes of both processes may be combined, e.g., via a linear or non-linear combination, to determine the best matching caller-agent pair.

The selection or mapping of a caller to an agent may then be passed to a routing engine or router for causing the caller to be routed to the agent at 912. The routing engine or router may be local or remote to a system that maps the caller to the agent. It is noted that additional actions may be performed, the described actions do not need to occur in the order in which they are stated, and some acts may be performed in parallel.

Variance Algorithm Mapping:

A further embodiment is next described for call mapping based at least in part on a variance algorithm. The example and description below is generally described in terms of agent performance (AP), however, an analogous problem exists for estimating caller propensities, for instance to purchase, and the same methodology applies. Accordingly, to avoid repeating terms, examples will be expressed in terms of agent performances (AP) with it being understood that this could refer to caller propensity (CP) equally based on various partitions.

An exemplary call mapping and routing system can utilize three different mathematical types of target data. Binomial, for instance conversion rate (CR) that is sale/no sale, multinomial, e.g., a number of revenue generation per unit (RGU's) sold per call, and continuous, e.g., revenue per call and handle time. All the techniques described here apply to all 3 kinds of data though they need differences in the mathematical techniques used, particularly in the Bayesian Mean Regression (BMR) case, as will be recognized by those of ordinary skill in the art. Again, to avoid cluttering the argument with repetition, term CR is used throughout but this should be understood to be a stand in for binomial, multinomial, or continuous data.

Systems and methods are provided herein that can be used to improve or optimize the mapping and routing of callers to agents in a contact center, where the mapping and routing of callers may use performance based routing techniques. In one aspect of the present invention, a method and system attempts to map or assign high performing agents to callers belonging to groups wherein agent performance makes a large difference to call outcomes and map or assign poor performing agents to callers in groups where agent performance makes relatively less of a difference. In one example, the method and system assumes that a partitioning of the callers has been made, e.g., $\{P\}$, which may be defined in many ways. Possible partitions may be based at least in part on caller demographics, caller NPA (aka area code) or NPANXX (first 6 digits on phone number), or vector directory number (VDN), or geographic area, or 800 number, or transfer number, to name a few. By whatever method, the callers are partitioned into sets for each of which various statistics for the partition may be calculated.

An exemplary process may be carried out as follows:

1. Calculate the best estimate of Agent Performance (AP's), for instance by a Bayesian mean regression method or the like. Divide the set of agents by their AP values into a top half set of best performing agents $\{T\}$ and a bottom half set of agents $\{B\}$. This may be done by splitting the agents at the median AP and assigning those with AP greater than the median to $\{T\}$ and the remainder to $\{B\}$. Note that in embodiments, the agents may be divided in more than two splits or groups based on performance, or based on one or more other parameters relating to demographics or personality.

2. Partition, by one or more computers, callers in a set of callers based on one or more criteria into a set of partitions. For each partition, $P_i$, calculate the mean Conversion Rate (CR) for calls in $P_i$ taken by agents in $\{T\}$ and perform the same calculation for agents in $\{B\}$. Then calculate a difference between these quantities, $\Delta$. Partitions with a large $\Delta$ are those in which agents make a lot of difference, that is, high performing agents obtain a much higher CR than low performing agents. Conversely, partitions with small or zero $\Delta$'s are ones where agents make little or no difference.

3. Calculate a ranking or percentile for the partitions by $\Delta$ from the highest $\Delta$ to the lowest $\Delta$, e.g., a partition in the $97^{th}$ percentile has 97% of the calls in partitions with a lower $\Delta$.

4. Calculate a percentile of the agent performances (AP's). (These percentilings are by numbers of calls in each group, caller partition or agent, and assure that there are approximately equal numbers of each available at matching time, thus avoiding biasing the pool of agents or callers). Thus, in embodiments an agent with a $97^{th}$ percentile has 97 percent of the calls going to agents with lower performance ranking.

5. In embodiments, calls may be assigned to agent—caller pairs where the difference between the percentile $\Delta$ for the partition of the caller and the percentile of the agent's AP is minimized. Thus, in embodiments, calls from partitions with a higher $\Delta$ will be matched to higher performing agents and calls with a lower $\Delta$ will be matched to lower performing agents.

Figure 11:
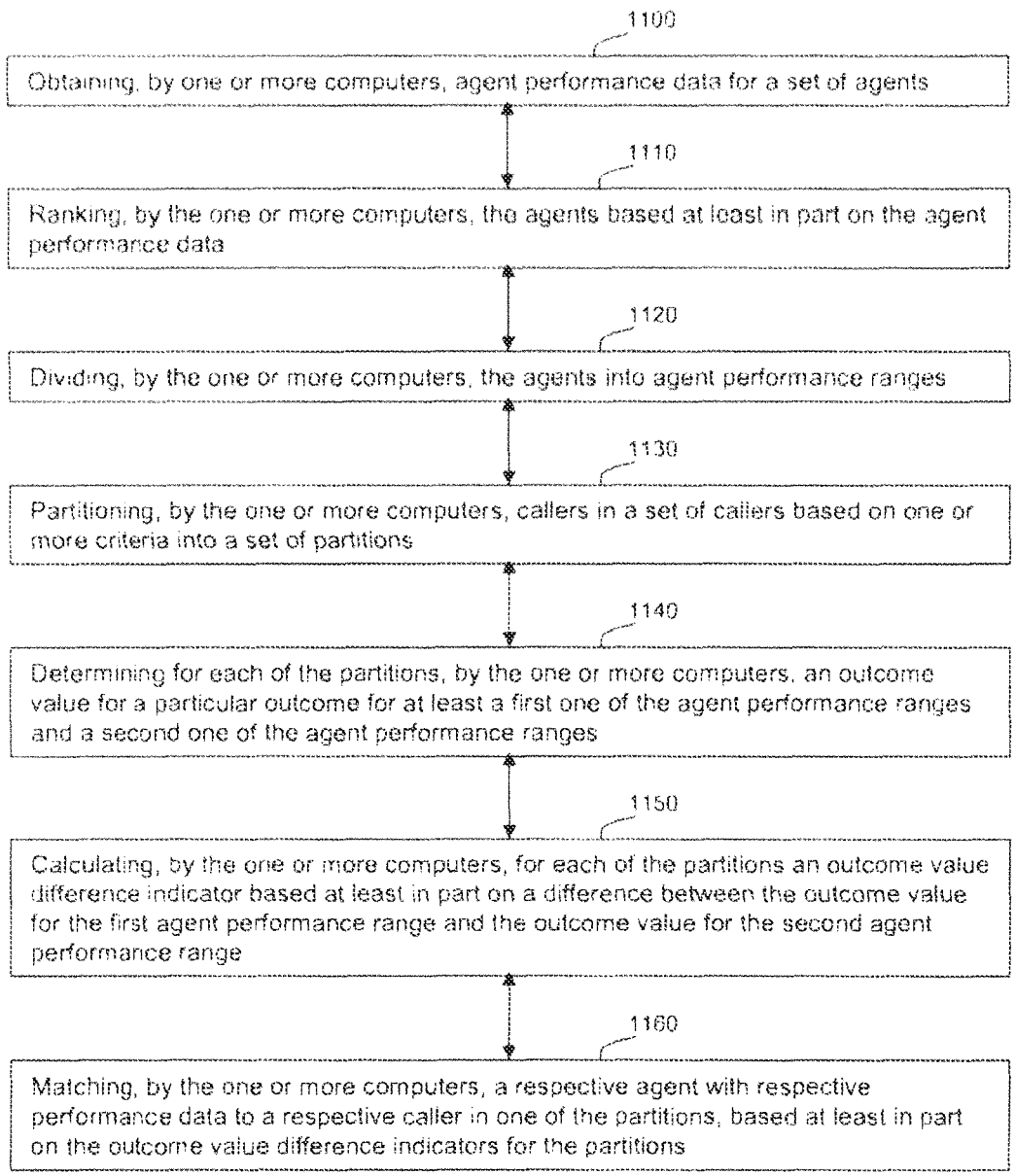
FIG. 11 illustrates an exemplary probability matching process or computer model for matching callers to agents using a variance algorithm.

Referring to FIG. 11, implementations of embodiments are disclosed. Block 1100 represents an operation of obtaining, by one or more computers, agent performance data for a set of agents. In embodiments, the agent performance data may comprise one selected from the group of sale/no sale, number of items sold per call, and revenue per call coupled with handle time. In embodiments, this performance data may be obtained by accessing a database containing such performance data.

Block 1110 represents an operation of ranking, by the one or more computers, the agents based at least in part on the agent performance data.

Block 1120 represents an operation of dividing, by the one or more computers, the agents into agent performance ranges based at least in part on the ranking step.

Block 1130 represents an operation of partitioning, by the one or more computers, callers in a set of callers based on one or more criteria into a set of partitions. In embodiments, the partition may be based at least in part on or more selected from the group of demographic data, area code, zip code, NPANXX, VTN, geographic area, 800 number, and transfer number, to name a few.

Block 1140 represents an operation of determining for each of the partitions, by the one or more computers, an outcome value at least for a first one of the agent performance ranges and an outcome value for a second one of the agent performance ranges. In embodiments, the outcome value comprises one or more selected from the group of sale, number of items sold per call, and revenue per call coupled with handle time. In embodiments, the determining an outcome value step may comprise determining a mean outcome value for a particular outcome for the agent performance range.

Block 1150 represents an operation of calculating, by the one or more computers, for each of the partitions an outcome value difference indicator based at least in part on a difference between the outcome value for the first agent performance range and the outcome value for the second agent performance range.

Block 1160 represents an operation of matching, by the one or more computers, a respective agent with respective performance data to a respective caller in one of the partitions, based at least in part on the outcome value difference indicators for the partitions.

In embodiments, the matching step may be based at least in part on a rule to assign a higher performing agent to a caller from one of the partitions where the outcome value difference indicator is higher relative to other of the outcome value difference indicators, wherein the higher performing agent is determined based at least in part on the agent performance data for the respective agent relative to the agent performance data for other of the agents. In embodiments, one or more threshold values may be used for the outcome value difference indicators and different ranges of agent performances may be associated with these respective thresholds. In embodiments, rankings or percentiles may be used, and agents with rankings or percentiles that are closest to the ranking or percentile of the outcome value difference indicator for the caller's partition may be matched.

In embodiments, the matching step further comprises the steps of calculating, by the one or more computers, a ranking or percentile for the partitions by Δ from a high Δ to a low Δ based at least in part on a first number of number of calls; and calculating, a ranking or percentile of the agent performances (AP's), by the one or more computers, for the respective agents in the set of agents based at least in part on the respective agent performance data and a second number of calls. In embodiments, these percentilings or rankings are by numbers of calls in each group, caller partition or agent, and assure that there are approximately equal numbers of each available at matching time, thus avoiding biasing the pool of agents or callers. In embodiments, the matching step may further comprise matching, by the one or more computers, the respective agent to the respective caller based at least in part on a rule to minimize a difference between the partition percentile or ranking of the outcome value difference indicator for the partition of the respective caller and the performance percentile or ranking of the respective agent.

In embodiments, a mix a performance data may be used. In embodiments, higher dimensional matching may be performed, wherein the matching step is performed for a conversion rate or a conversion rate delta, and a handle time, or a customer satisfaction score.

In embodiments, a mix of matching algorithms may be used. For example, the one or more computers may be configured with program code to perform, when executed, the steps of: switching, by the one or more computers, between the outcome value difference indicator matching algorithm and a second matching algorithm that is different from the outcome value difference indicator matching algorithm, based on one or more criteria. In this example, when there has been switching to the second matching algorithm, then performing, by the one or more computers, the second matching algorithm to match a respective one of the agents with a respective one of the callers. In embodiments, the second matching algorithm may be a pattern matching algorithm, or a closest percentile or ranking matching of agents and callers, or other matching type algorithm. In embodiments, the system may switch to a random matching algorithm or a pure queue based algorithm to demonstrate the relative effectiveness of the use of the outcome value difference indicator matching algorithm as compared to a random or queue-based matching.

In embodiments, the one or more computers are configured with program code to perform, when executed, the steps of: obtaining results data, by the one or more computers, using each of the outcome value difference indicator matching algorithm and the second matching algorithm in the matching step; obtaining or receiving, by the one or more computers, a switch-over point in the distribution for agent performance and/or the distribution for caller propensity where better results are obtained from one of the algorithms relative to the other of the algorithms; and using, by the one or more computers, this switch-over point to switch between the algorithms. The switch point may be determined empirically, by reviewing the performance data of the algorithm models based on the two different types of performance data. This review may be performed manually or may be determined automatically, on a periodic or aperiodic basis or at runtime, based on a comparison of performance results and a determination that a predetermined difference threshold between the performance results for the respective algorithms has been exceeded. In embodiments, the use of a mix of performance data may also be used for handle time, or customer satisfaction, or another parameter.

In embodiments, a pure conversion rate ranking or percentile may be used for low agent conversion rates (e.g., poor sales). Then the system may switch to using rankings or percentiles for delta. Accordingly, in embodiments, the one or more computers may be configured with program code to perform, when executed, the steps of: switching, by the one or more computers, between the outcome value difference indicator matching algorithm and a second matching algorithm configured to match a respective agent with a respective ranking or percentile to a caller in one of the partitions with a closest ranking or percentile, based on one or more criteria; and when there has been switching to the second matching algorithm, then performing, by the one or more computers, performing the second matching algorithm to match a respective one of the agents with a respective one of the callers.

Time Effects Compensation:

A further time effects embodiment for call mapping is disclosed that compensates for time effects which may stand on its own or be incorporated into other embodiments herein. As noted previously, the example and description below is generally described in terms of agent performance (AP), however, an analogous problem exists for estimating caller propensities, for instance to purchase, and the same methodology applies. Accordingly, to avoid repeating terms, examples will be expressed in terms of agent performances (AP) with it being understood that this could refer to caller propensity (CP) equally.

Conversion Rates (CR's) in call centers typically vary over time. For example, there are periodic changes, such as variations in CR through the day, day of week effects, and longer cycles. There may also be secular changes. Causes for the latter include marketing campaigns, seasonal effects such as spending in the holiday season, and the state of the economy.

Figure 13:
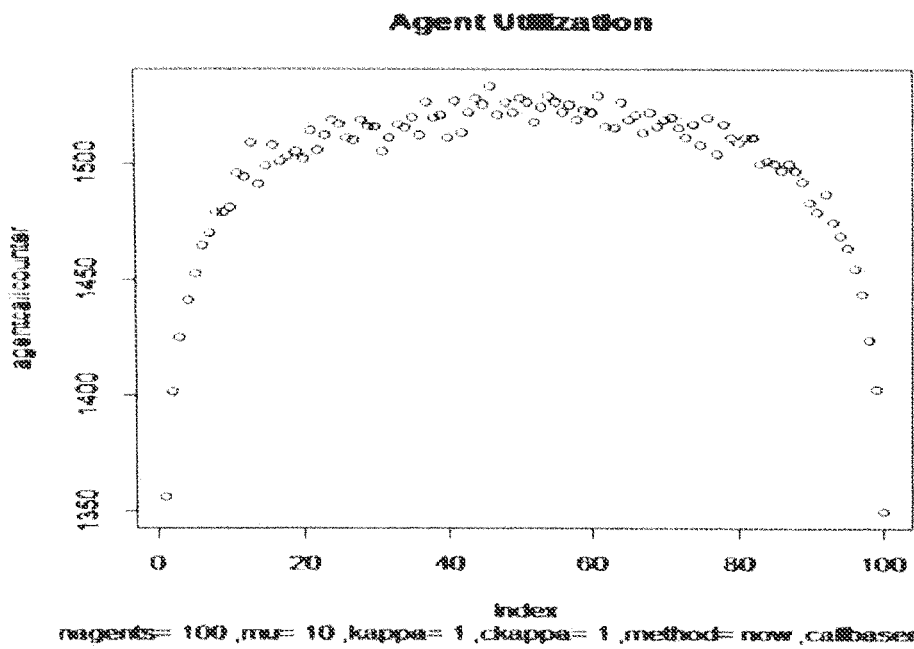
FIG. 13 is an exemplary graph of agent utilization with nagents=100, mu=20, Kappa=1 and no edge correction.
Figure 14:
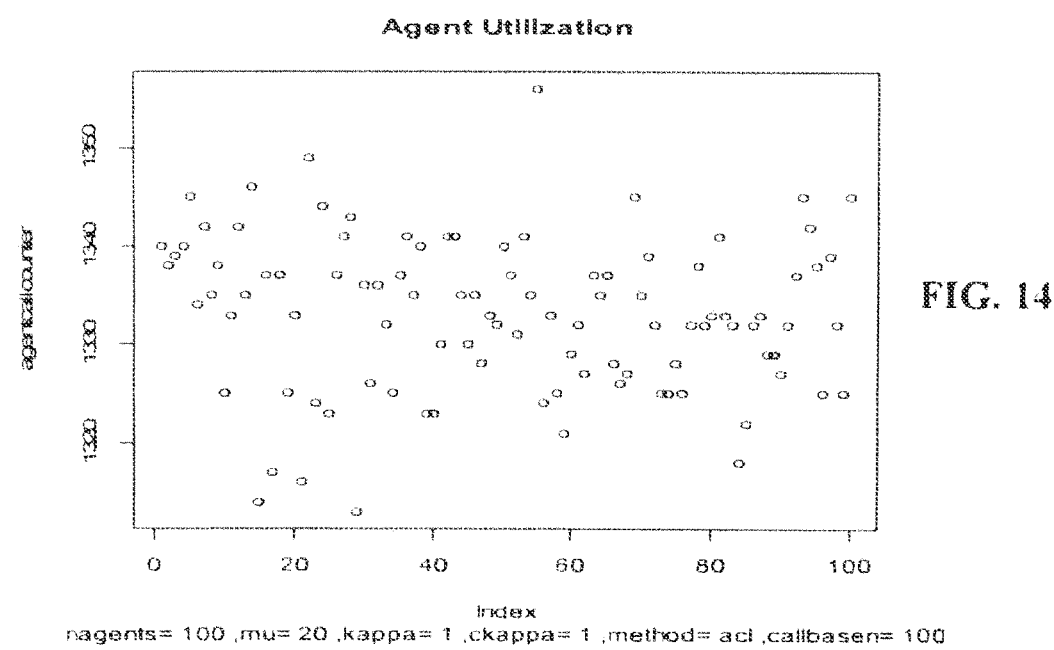
FIG. 14 is an exemplary graph of agent utilization with nagents=100, mu=20, Kappa=1 and a topological edge correction (Alternating Circle Method).
Figure 15:
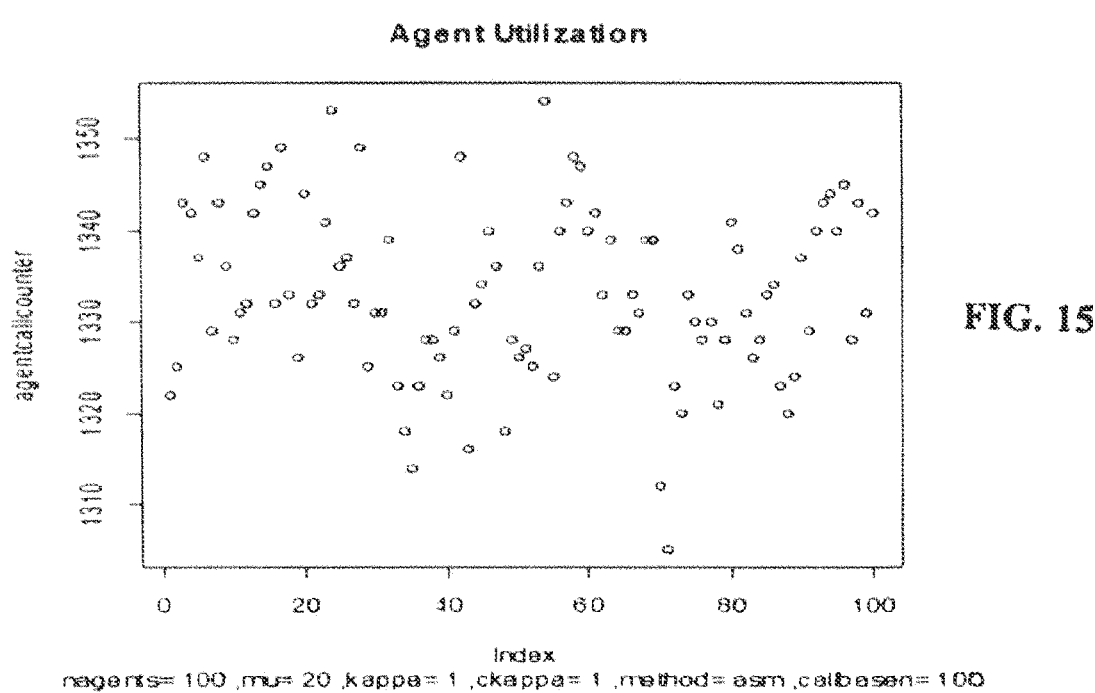
FIG. 15 is an exemplary graph of agent utilization with nagents=100, mu=20, Kappa=1 and the Adaptive Shift Method of edge correction.
Figure 16:
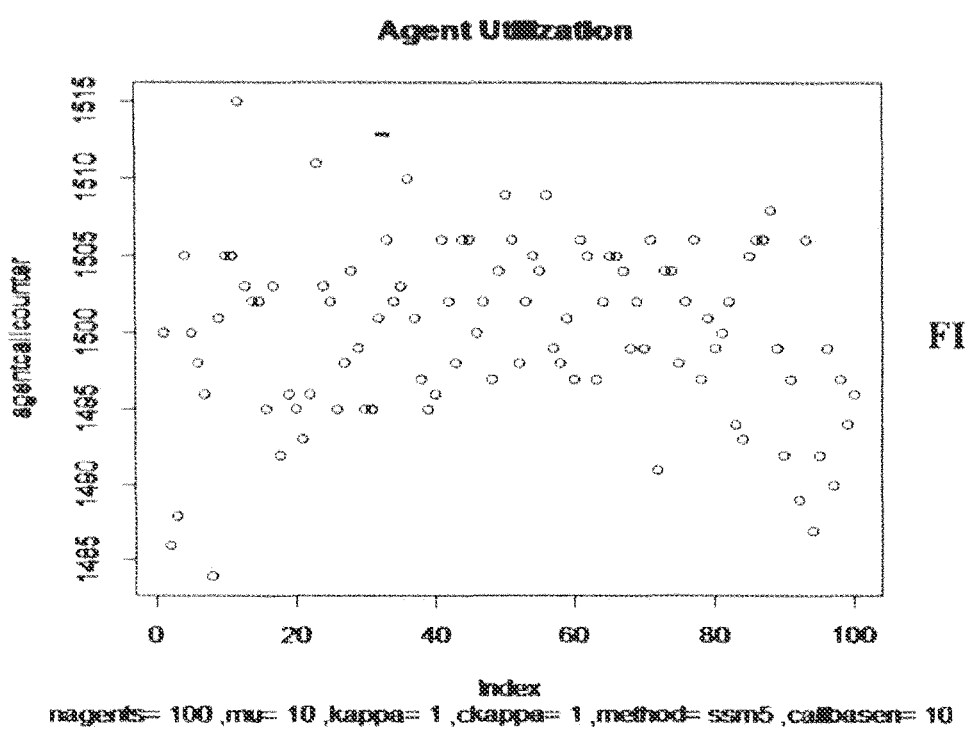
FIG. 16 is an exemplary graph of agent utilization with nagents=100, mu=10, Kappa=1 and the Static Shift Method v5 of edge correction.
Figure 17:
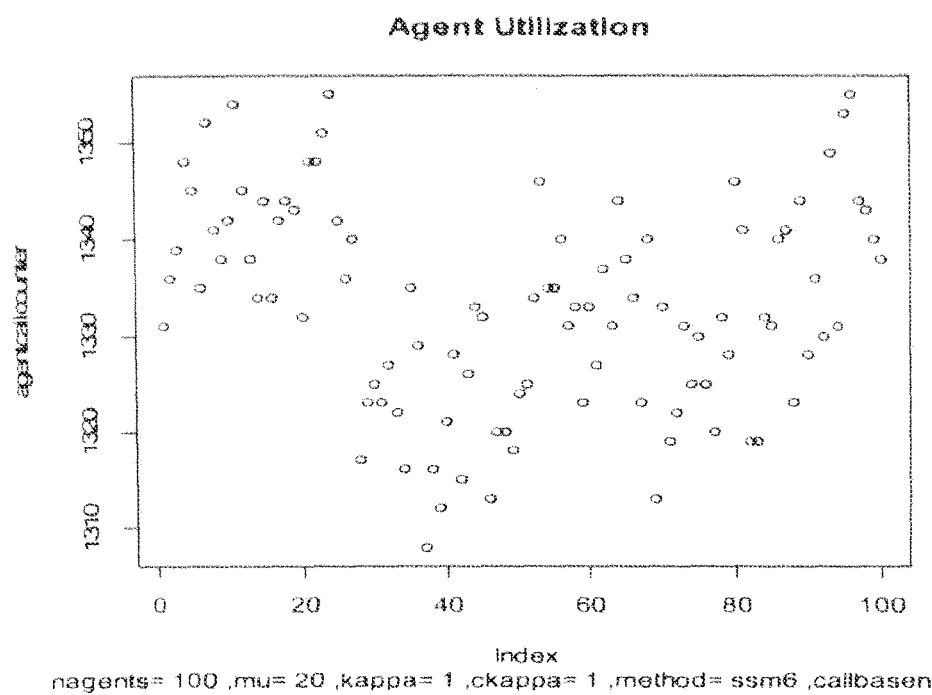
FIG. 17 is an exemplary graph of agent utilization with nagents=100, mu=20, Kappa=1 and the Static Shift Method v6 of edge correction.
Figure 18:
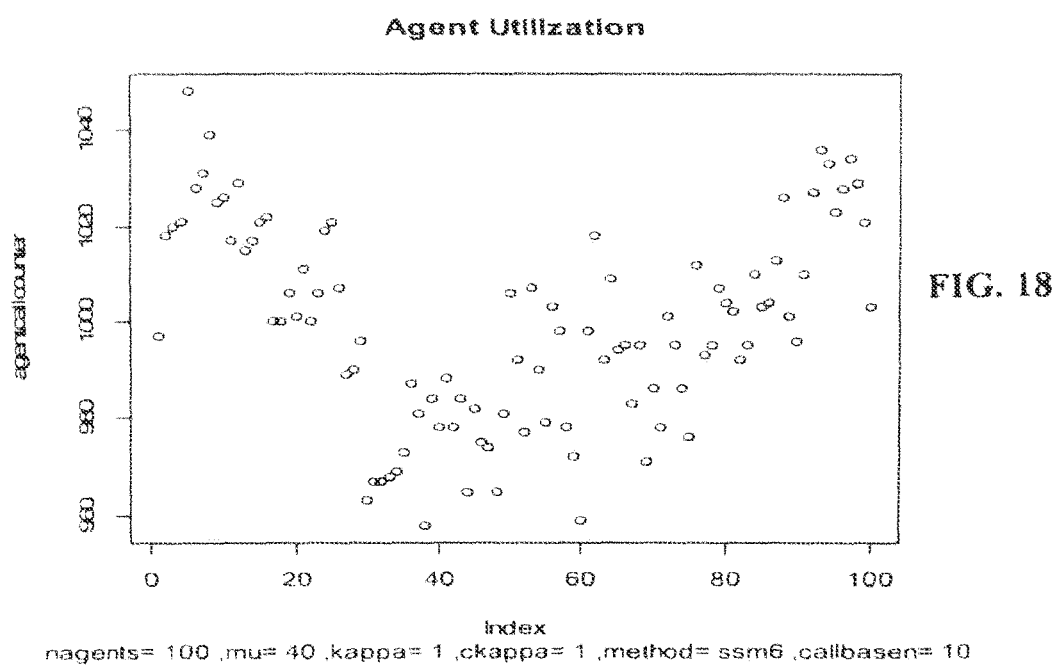
FIG. 18 is an exemplary graph of agent utilization with nagents=100, mu=40, Kappa=1 and the Static Shift Method v6 of edge correction.
Figure 19:
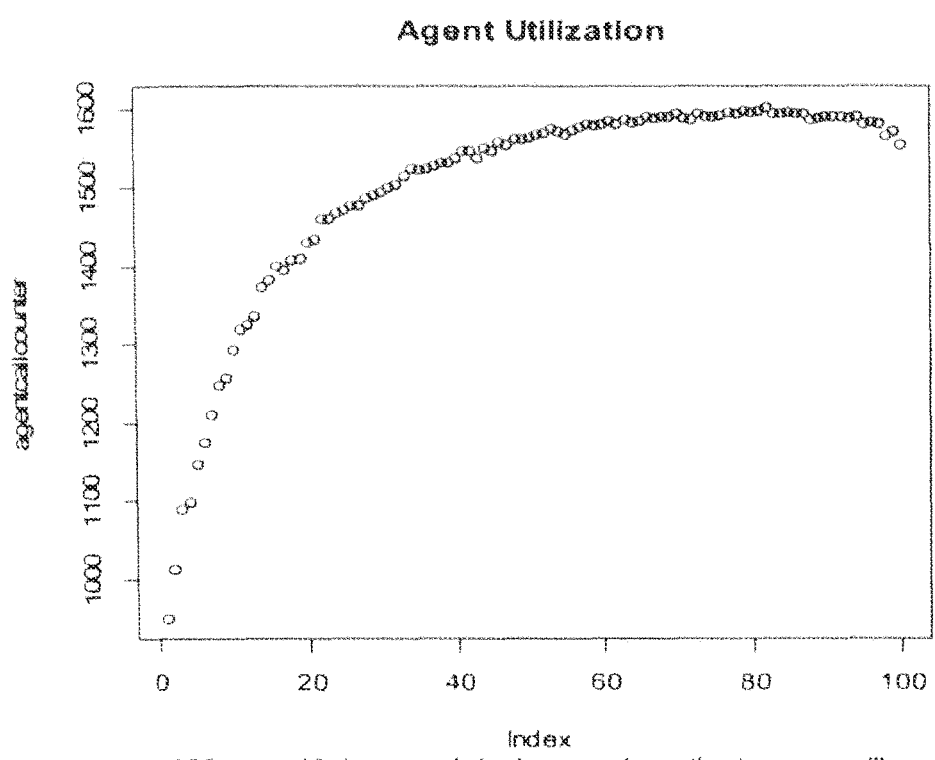
FIG. 19 is an exemplary graph of agent utilization with nagents=100, mu=10, Kappa=1.4 and the Adaptive Shift Method of edge correction.
Figure 20:
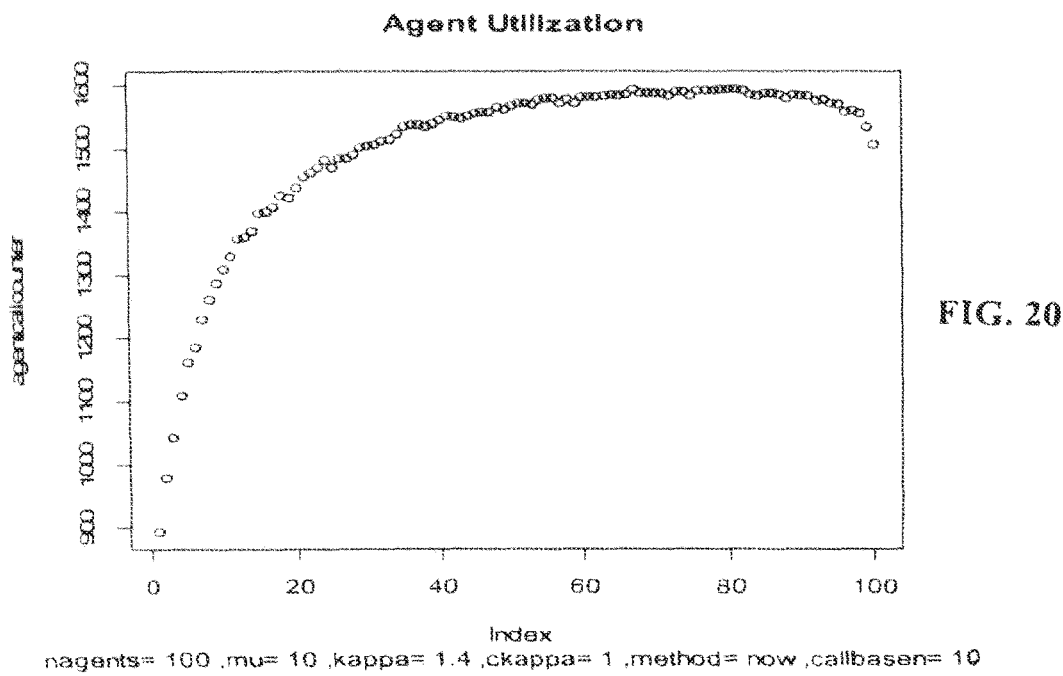
FIG. 20 is an exemplary graph of agent utilization with nagents=100, mu=10, Kappa=1.4 and no edge correction.
Figure 21:
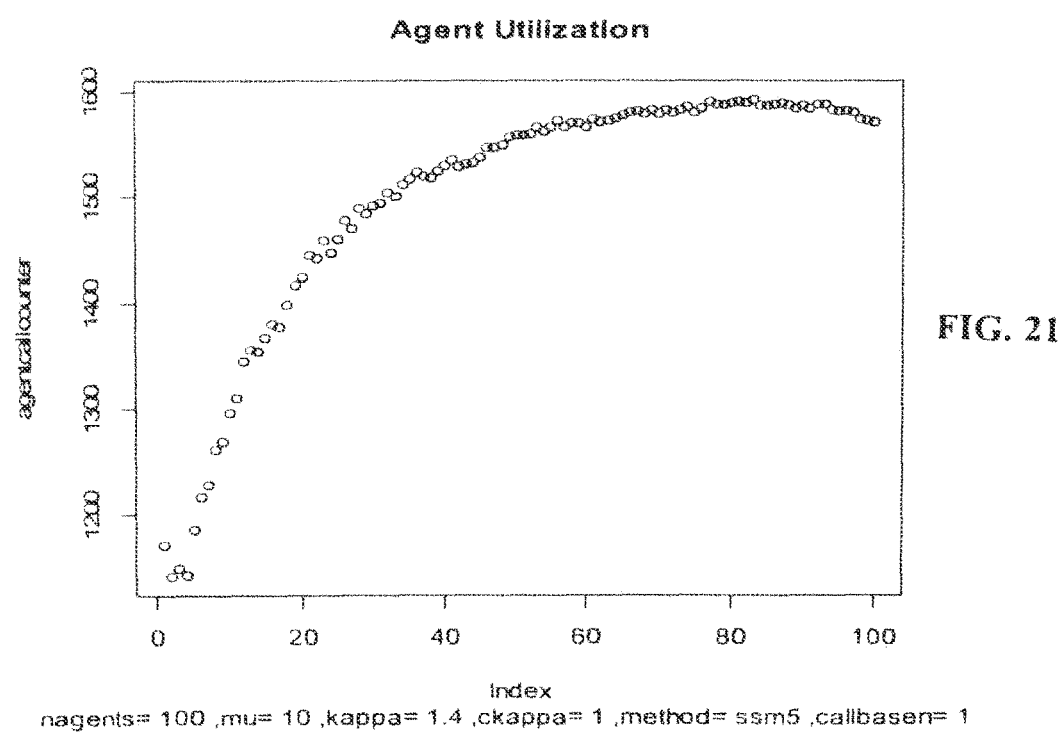
FIG. 21 is an exemplary graph of agent utilization with nagents=100, mu=10, Kappa=1.4 and the Static Shift Method v5 of edge correction.
Figure 22:
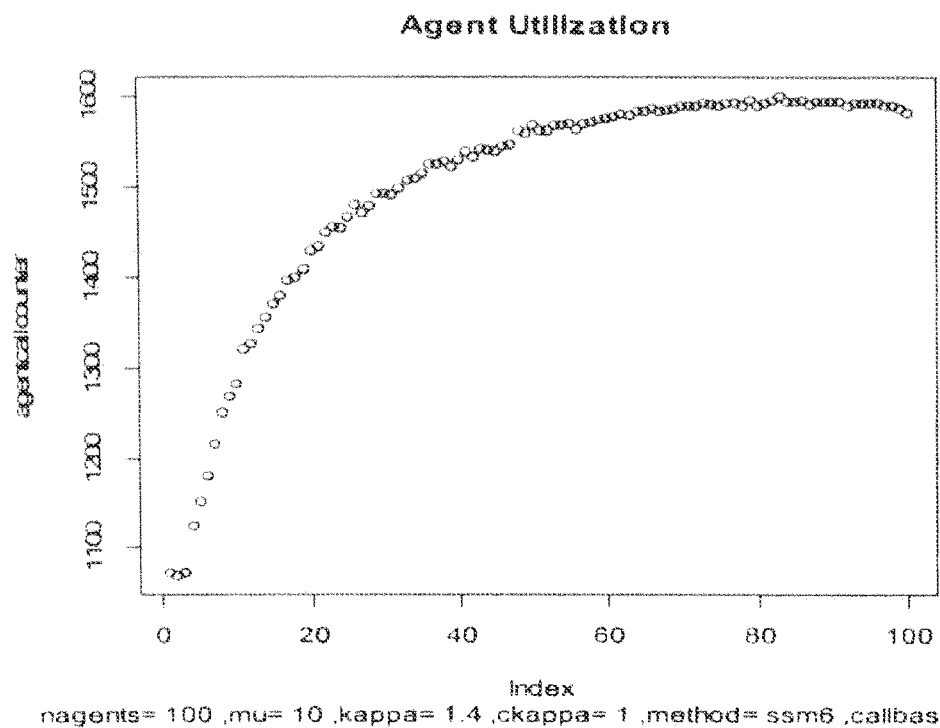
FIG. 22 is an exemplary graph of agent utilization with nagents=100, mu=10, Kappa=1.4 and the Static Shift Method v6 of edge correction.
Figure 23:
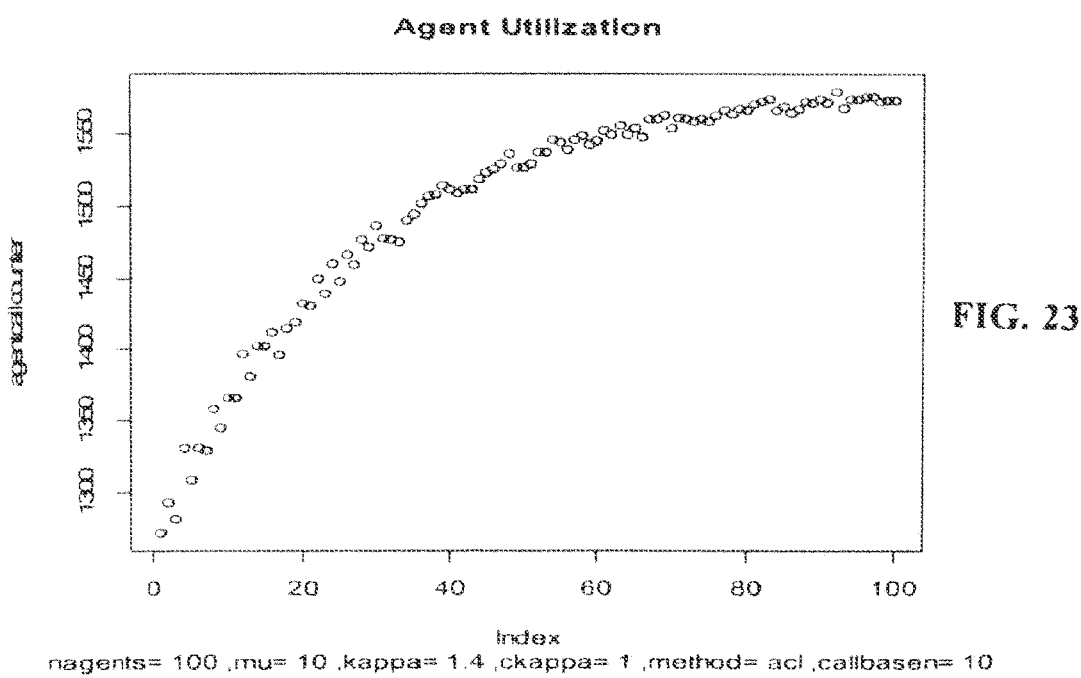
FIG. 23 is an exemplary graph of agent utilization with nagents=100, mu=10, Kappa=1.4 and the Alternating Circle Method of edge correction.

These effects, if not compensated for, can impact accurate calculation of both Agent Performance (AP) and CP. For example, if a particular call center had a higher CR for nighttime calls than during the daytime, then agents who only worked a night shift would appear to have a higher performance than those that worked during the day. But this higher performance would be an artifact and if uncorrected, would result in an inaccurate AP. See FIGS. 12-14.

Systems and methods are provided herein that can be used to improve or optimize the mapping and routing of callers to agents in a contact center, where the mapping and routing of callers may use performance based routing techniques. In one aspect of the present invention, systems and methods are provided for mapping callers to agents based on agent and/or caller data, wherein the agent and/or caller data includes or is based on timing effects (e.g., time data or information that affects one or more of the agent and/or caller data used to determine the mapping of callers to agents. For instance, agent data and caller data utilized by a pattern matching algorithm may include time effect data associated with performance, probable performance, or output variables as a function of one or more of time of day, day of week, time of month, time of year, to name a few. The pattern matching algorithm may operate to compare caller data associated with each caller to agent data associated with each agent to determine an optimal matching of a caller to an agent, and include an analysis of time effects on the performance of agents or probable outcomes of the particular matching when performing the matching algorithm.

In embodiments, secular trends in CR may be detected by smoothing of the call center data, for instance with a one day or one week moving window average. Periodic effects may be detected both by a power spectral analysis techniques such as the FFT or Lomb Scargle Periodogram (William H. Press and George B. Rybicki Fast Algorithm for Spectral Analysis of Unevenly Sampled Data Astrophysical Journal, 338:277-280, March 1989, which is incorporated herein by reference), day of week CR, hour of day CR, across many epochs. For example, a data sample of 3 months of data may be used, and a mean and standard errors (SE) of the mean may be calculated for all the Mondays, Tuesdays, etc.), and by simply computing means and standard errors of the mean.

Figure 24:
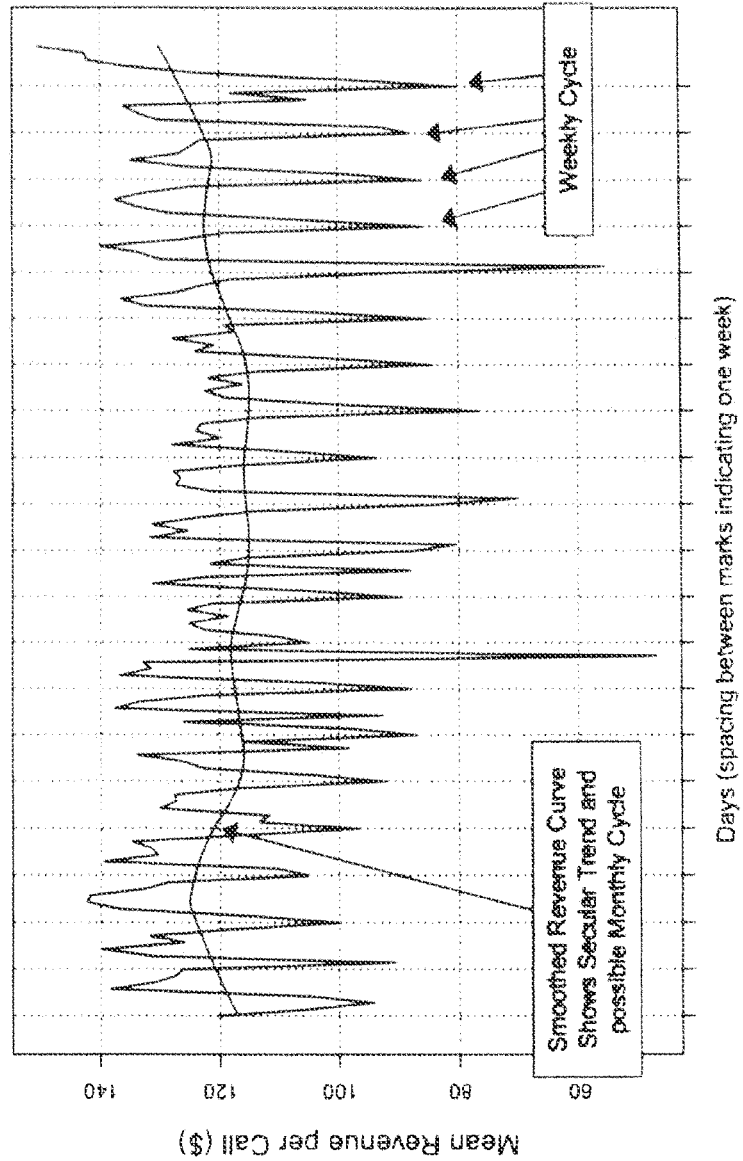
FIG. 24 is an exemplary graph illustrating the time effects of mean revenue per call vs. days in a week in a month.
Figure 25:
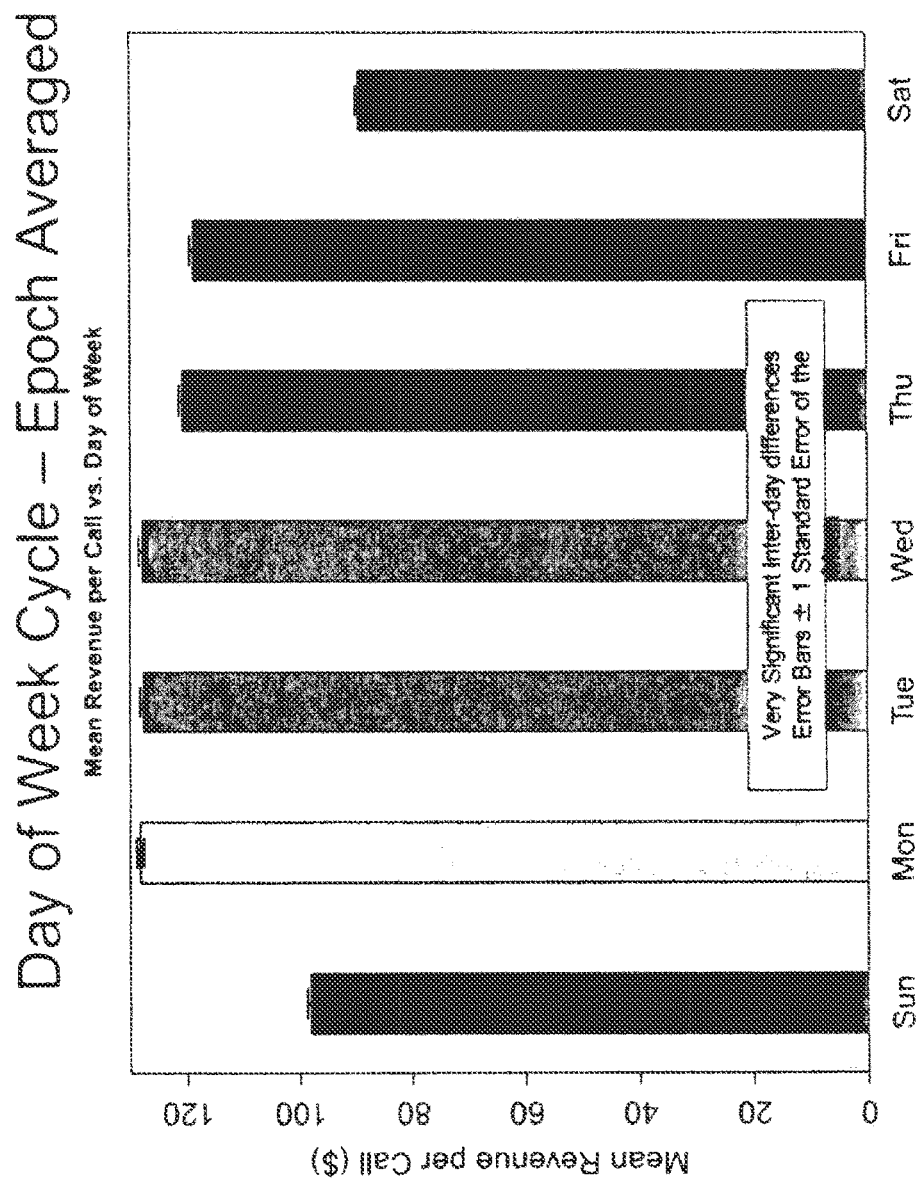
FIG. 25 is an exemplary graph illustrating the time effects of mean revenue per call vs. days in one week.
Figure 26:
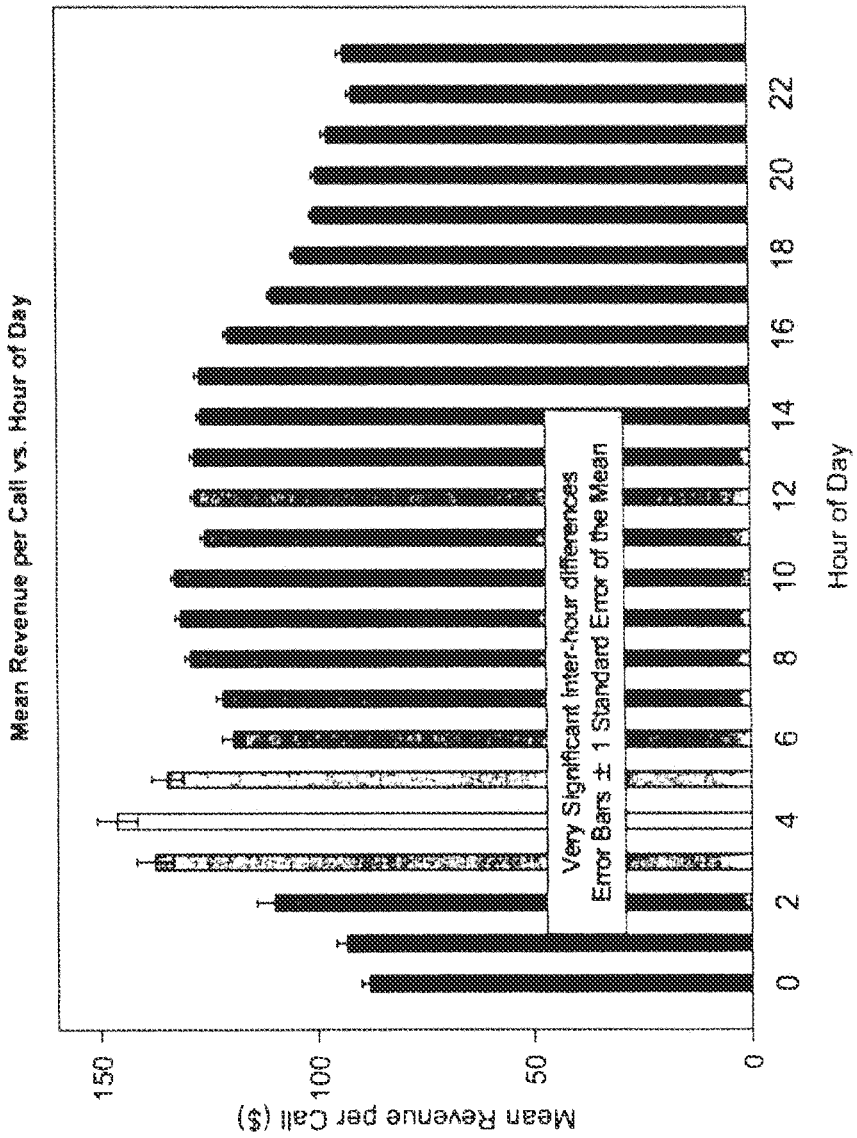
FIG. 26 is an exemplary graph illustrating the time effects of mean revenue per call vs. hours of the day.
Figure 27:
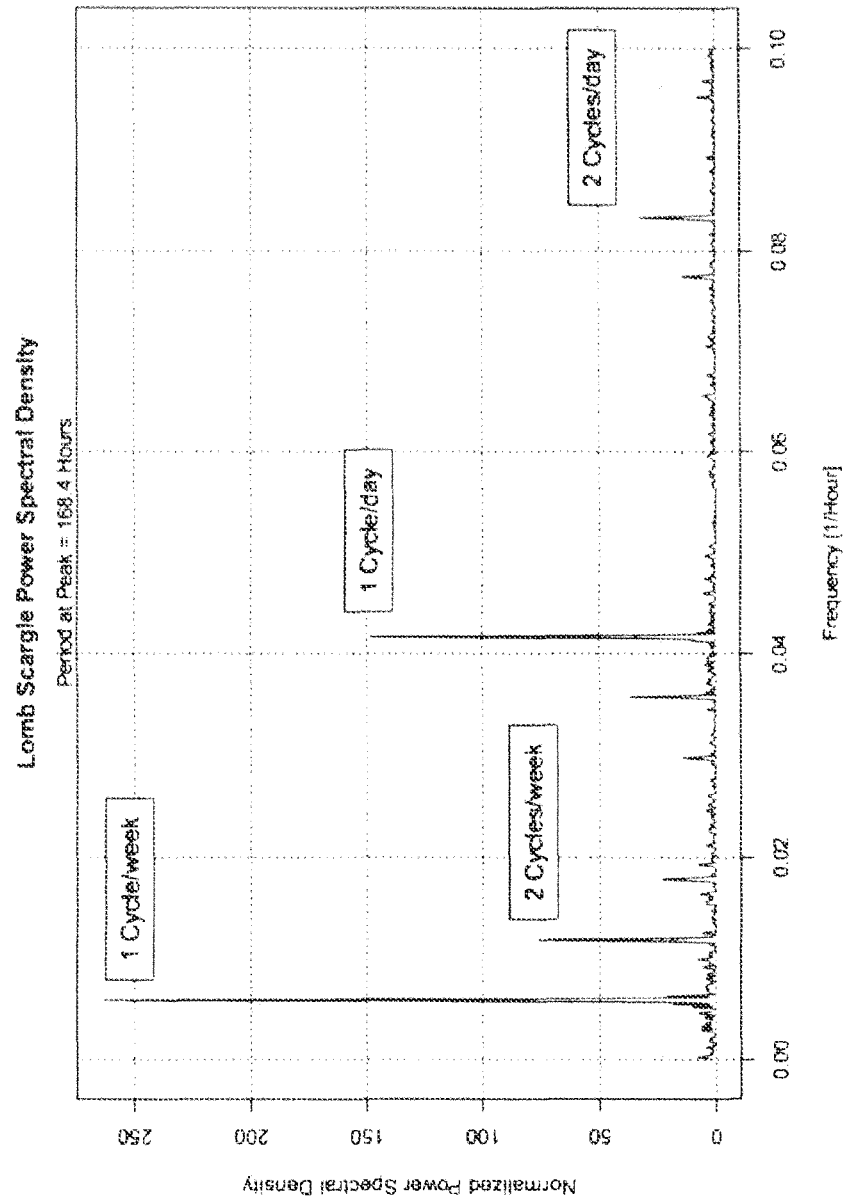
FIG. 27 is an exemplary graph illustrating normalized power spectral density vs. frequency (1/hour).

FIGS. 24-27 show evidence of hour of day, day of week and other cycle timing effects and exemplify the above. FIG. 24 illustrates mean revenue variations over a month. FIG. 25 illustrates mean revenue variations over days of the week. FIG. 26 illustrates mean revenue variations over hours of the day. FIG. 27 illustrates a normalized power spectral density vs. frequency (1 hour).

Exemplary Methods of Correcting for Secular Trends are provided. Daily means of CR from a period, typically some months long, are fitted either with a linear least squares regression or a locally weighted least squares smoother like lowess (see e.g., Cleveland, W. S. (1979) Robust locally weighted regression and smoothing scatterplots. J. Amer. Statist. Assoc. 74, 829-836, which is incorporated herein by reference) or loess. Corrected CR data can then be obtained by dividing the raw daily time series by the fitted values.

Exemplary Methods of Correcting for Periodic Variations are also provided. Epoch averages of CR (conversion rate) by hour of day (HOD), or by day of week (DOW) or by hour of week (HOW), which combines HOD and DOW effects in one variable, may be computed from a suitably long data sample.

Below are 3 exemplary methods of correction:

1. Additive: A new target variable is defined as the raw target variable less the epoch average for the epoch in which the call occurs. In this method and the methods to follow, the term "target variable" means whatever variable the call mapping system is optimizing. In the case of conversion rate, it would be {O, I}, in the case of revenue generating units (RGU), the number of RGUs per call, or in the revenue case the revenue per call.

2. Multiplicative: A new target variable is defined as the raw target variable divided by the epoch average for the epoch in which the call occurs.

3. Microskill Method: The relevant time effect, HOD, DOW, or HOW is combined with the skills (or VDNs) used in the AP calculation by forming the outer product. For example, if are 2 skills, A and B, and one were considering the DOW correction only, one could form 2×7=14 new microskills comprising A & Monday, A & Tuesday, . . . , A & Sunday, B & Monday, B & Tuesday, . . . , B & Sunday. These 14 microskills would then be used as the factor in the BMR calculation of agent performance. For example, when time effects are applied at the skill level or the VDN level, and there are 10 skill for an agent that are measured, then a time effects adjustment for the respective agent may be made for each hour of the 24 day for each of the 10 skills, e.g., 10×24=240 time effects adjustments made to the performance data, i.e., a microskill adjustment.

When corrected data with a new target variable has been computed, AP and CP and all other mapping calculations may be done using the corrected target variable.

In embodiments, a method for correcting, by the one or more computers, for time effects comprises subtracting from a target outcome variable an epoch average from a desired outcome data sample, wherein the epoch average comprises an average of one selected from the group of hour-of-day, day-of-week, and hour-of-week desired outcome data from an epoch in which a respective call occurs, to obtain a new target outcome variable.

In embodiments, a method for correcting, by the one or more computers, for time effects comprises dividing a target outcome variable by an epoch average from a desired outcome data sample, wherein the epoch average comprises an average of one selected from the group of hour-of-day, day-of-week, and hour-of-week desired outcome data from an epoch in which a respective call occurs, to obtain a new target outcome variable In embodiments, a method for correcting, by the one or more computers, for time effects comprises forming an outer product by combining selected epoch data, such as hour-of-day, day-of-week, and hour-of-week desired outcome data from an epoch in which a respective call occurs, to obtain a factor to be used in the Bayesian Mean Regression (BMR) calculation of agent performance.

Distribution Compensation:

In embodiments, matching algorithms may be used to match agents to callers where a given number reflecting a parameter of an agent is matched to a caller with the closest number reflecting a different parameter of the caller. For example, in embodiments, the number for the agent may be a rank or a percentile reflecting the performance of the respective agent relative to other agents in a set of agents. Likewise, the number for the caller may be a rank or percentile of the caller relative to other callers in a queue or other grouping, such as for caller propensity for something. In embodiments, the rank or percentile may be for a partition (e.g., demographic, zip code, area code, etc.) of the callers based at least in part on whether or not the level of performance of the agent makes a difference in the outcome of the call.

When such algorithms are used, it has been discovered that, using the example of agent performance percentiles, the matching algorithm tends to assign/cluster callers to agents in the middle percentiles in the distribution of performances at the expense of agents at the ends of the distribution (e.g., the worst agents and the best agents). In embodiments, to compensate for this effect, an edge compensation algorithm is provided to increase the likelihood that agents at the edges of the performance distribution are utilized more. In one embodiment, the edge compensation algorithm takes the agents that are free at runtime, and rescales the respective agent performances for these runtime available agents to provide more space/margin at the edges of the performance distribution, e.g., weighting the performance numbers for the worst agents to increase their respective performance levels and/or to decrease the respective performance levels of the best agents. The amount of the margin of weighting is based on the number of agents that are free at runtime. For example, if there are n agents working of which k are free to take the call, we linearly rescale the n agent percentiles so that the bottom agent has percentile $100/(2*k)$ and the top agent has percentile $100*(1-(2/k))$. In another embodiment, the edge compensation algorithm takes the callers in a queue or other grouping and rescales the respective caller propensity rankings or percentiles, to provide more space/margin at the edges of the distribution, e.g., weighting the propensity numbers for the worst callers to increase their respective propensity levels and/or to decrease the respective propensity levels of the best callers. The amount of the margin of weighting is based on the number of callers that are in the queue or in the grouping at runtime.

Various examples of edge compensation algorithm are now provided.

Notation & Setup

Percentiles have all been divided by 100 and lie between 0 and 1.

This experimentation is for a one dimensional unit interval caller to agent matching algorithm, where the goals are to:
1. Minimize the average difference between agent and caller percentiles.
2. In the absence of explicit interpolation towards performance routing have a uniform utilization of agents or average wait time for callers.
3. Incorporate a simple algorithm to interpolate between uniform utilization of agents and performance based routing.

L1=A situation where there are multiple free agents and a single call arrives and is routed to one of the free agents L2=A situation where there are multiple calls in the queue and a single agent becomes available. One of the calls in the queue is routed to the free agent.

Kappa=In the L1 situation: A method of interpolating between pure performance routing (when a call comes it is assigned to the best performing free agent) and a more uniform agent utilization, An embodiment is the rescaling of agent percentiles by raising the percentile to the kappa power for some kappa greater than 1.

Rho=In the L2 situation: A method for when there are of interpolating between pure performance routing (When an agent becomes comes available and is assigned to the best call in the queue. In this case calls with low percentile may have waiting times much longer than calls with high percentiles) and a more uniform call expected waiting time algorithm. An embodiment is the rescaling of caller percentiles by raising the percentile to the rho power for some rho greater than 1.

The code to experiment was written in R.

T=time in seconds, time is discrete method=has values now for the current methodology, lah for Look Ahead Method, asm for Adaptive Shift Method, ssm for Static Shift Method, ssm6 for Static Shift Method v6, adm for Average Distance Method, and acl for Alternating Circle, for the new methods being analyzed nagents=number of agents aht=average handling time mu=equilibrium average number of free agents base_ap=agent percentile before any adjustments or transformations, evenly distributed in [0,1) starting at 1/(2*nagents)

base_cp=caller percentile before any adjustments or transformations, uniformly distributed in [0,1)

method_ap=vector of agent percentiles after any adjustment or transformation due to the method applied.

method_cp=vector of callers percentiles who are in the queue waiting for agents in the order in which they entered the queue after any adjustment or transformation due to the method applied.

base_ap[freeagents]=the vector of agent percentiles for free agents only base_cp[freeagents]=the vector of caller percentiles for call in the queue Adaptive Shift Method L1

Method: This is the situation where there are one or more free agents and at most one call in the queue. At any point in time, shift the percentiles of the agents by {(1−max(base_ap[freeagents]))−max(base_ap[freeagents])}/2. That is:

$$asm\_ap=base\_ap+(1-\max(base\_ap[freeagents]))/2-\min(base\_ap[freeagents])/2$$

Theory: The basis for this method is the observation that there would be no edge effect if there were no edge. That is, if the agent and caller percentiles were evenly distributed along a circle of length 1. Naively applied, this would result in some awful matches as callers with base_cp close to 1 might be matched with agents whose base_ap is close to 0. The critical observation for avoiding this is that under the naïve adaptive shift methodology, the probability that the call is assigned to the $i^{th}$ free agent is $(asm\_ap_{i+1}-asm\_ap_{i-1})/2$ for an internal (neither the top ($n^{th}$) nor the bottom ($i^{th}$)) free agent and $(1-asm\_ap_n+asm\_ap_2)/2$ for the bottom agent and $(asm\_ap_1+1-asm\_ap_{n-1})/2$ for the top free agent. If the free agent percentiles are rigidly shifted at runtime so that the bottom and top edges are the same, then the probabilities are preserved and the zero call is always matched to the bottom free agent and the 1 call is always matched to the top free agent. A downside of this method is that some interior matches will be less than optimal due to the shift.

Kappa: Implementation of Kappa to first order, Kappa>1 results in higher utilization of the top agents and lower utilization of the bottom agents. However, the adaptive shift means that this imbalance in utilization results in a larger edge region allocated to the bottom—which results in a second order increase in utilization of the bottom. Numerical simulation confirms this, resulting in an edge tendency to the mean. Numerous functional forms were numerically attempted to compensate for the secondary effects. The final functional form selected was:

$$ap=base\_ap-min(base\_ap[freeagents])+(min(base\_ap[freeagents])/1)^{(kappa-1)}*0.5*(min(base\_ap[freeagents])+(1-max(base\_ap[freeagents])))$$

$$ap=ap^{\wedge}kappa.$$

Adaptive Shift Method L2:
Method: This is the situation where there are one or more callers in the queue and at most one free agent. At any point in time, shift the percentiles of the call queue by $\{(1-\max(base\_cp))-\max(base\_cp)\}/2$. That is:

$$asm\_cp=base\_cp+(1-max(base\_cp))/2-max(base\_cp)/2.$$

Theory: The basis for this method is the observation that there would be no edge effect if there were no edge. That is, if the agent and caller percentiles were evenly distributed along a circle of length 1. Naively applied, this would result in some awful matches as callers with base_cp close to 1 might be matched with agents whose base_ap is close to 0. When there is a single agent, the adaptive shift method prevents these awful matches by rotating the callers' percentiles so that the agent is equally likely to be to the left of the caller with the lowest base_cp or to the right of the caller with the highest base_cp. This results in the same probability that any give caller in the queue is matched as when done on the circle. The downside of this method is that some interior matches will be less than optimal.

Rho: Rho is simple to implement with the formula below and there are no complications.

$$asm\_cp \text{ with } rho=asm\_cp^{\wedge}rho.$$

Note: When there is a single free agent and multiple callers in the queue, one should not apply a shift to the agent's percentile because that shift will move the agent's percentile to 0.5 and automatically match to the median percentile caller. One should leave the agent percentile unchanged and only shift the callers' percentile. Similarly, when there is a single caller and multiple free agents, one should only shift the agents' percentile. When there are multiple free agents and multiple callers in the queue many possibilities come to mind three are: 1) no shift until enough callers and agents have been paired so that there is either one caller or one agent left unmatched and then revert to the adjusted shift method; or 2) shift the larger group shift until enough callers and agents have been paired so that there is either one caller or one agent left unmatched and then revert to the adjusted shift method; or 3) shift both groups until enough callers and agents have been paired so that there is either one caller or one agent left unmatched and then revert to the adjusted shift method. The particular method chosen will be dependent on a number of factors, including, but not limited to: match accuracy; simplicity; abandoned call behavior; and external service level agreements (e.g. limiting call wait time or regarding agent utilization).

Note (Theoretical Performance Limits): Because there is interaction between the top and bottom of the agent stack, it is clear that this method is not the best possible utilization homogenization solution from the view of accuracy of match.

Static Shift Method: L1
Method: This is the situation where there are one or more free agents and at most one call in the queue. At any point in time, rescale the percentiles of the agents to a length of (1−1/countfreeagents) and shift the percentiles by 1/(2*count_freeagents). That is:

$$ssm\_ap=base\_ap*(1-1/count\_freeagents)+1/(2*count\_freeagents)$$

Theory: This method is an attempt to address the major weakness of the Adaptive Shift Method. That is—the direct interaction between the top and bottom agents which lowers match performance and makes kappa difficult to implement. We attempt to average out the cumulative effect of the adaptive shifts and perform a static affine transformation. The transformation is quite ad hoc. Additional variations are possible.

Kappa: Kappa is simple to implement via the formula below and there are no complications, although there is a slight decrease in utilization of the top agents.

$$ssm\_ap \text{ with } kappa=ssm\_ap^{\wedge}kappa.$$

Static Shift Method: L2:
Method: The same theory as for the Adaptive Shift Methodology.
Theory: The same method as for the Adaptive Shift Methodology.
Rho: Rho is simple to implement with the formula below and there are no complications.

$$ssm\_cp \text{ with } rho=ssm\_cp^{\wedge}rho.$$

Static Shift Method: v5 and v6: L1:
Method: This is the situation where there are one or more free agents and at most one call in the queue. At any point in time, first rescale the base_ap to start at 0 and end at 1 rather than start at 1/(2*nagents) and end at 1−(1/(2*nagents)), second rescale the percentiles of the agents to a length of (1−1/countfreeagents) and shift the percentiles by 1/(2*countfreeagents). That is:

$$ssm6\_ap=(base\_ap-1/(2*nagents))*(1-1/nagents)*(1-1/countfreeagents)+1/(2*countfreeagents).$$

Theory: This method is an attempt to address the major weakness of the Static Shift Method. A pattern emerges in the utilization when there are relatively few free agents. A number of variations were tested—through v8, but v5 and v6 are listed here. The transformation selected is quite simple although it is ad hoc. Some patterns remain, although they are muted.

Kappa: For v5, kappa is applied directly.

$$asm5\_ap \text{ with } kappa=asm5\_ap^{\wedge}kappa$$

However, it was found that the edge buffers inserted by ssm5 should be adjusted when kappa is applied—otherwise the utilization of the bottom agent is too high and of the top agent is too low. An ad hoc adjustment that seemed to word reasonably well is to divide the bottom edge buffer by kappa and add the difference to the top edge buffer. This is what was chosen for ssm6.

asm6_ap with kappa=(asm6_ap−(1/(2*countfree-agents))+(1/(2*countfreeagents))/(kappa))^kappa.

Static Shift Method: v5 and v6: L2:
Method: The same theory as for the Adaptive Shift Methodology.
Theory: The same method as for the Adaptive Shift Methodology.
Rho: For v5, rho is applied directly.

asm5_cp with rho=asm5_cp^rho.

Average Distance Method: L1:
Method: This is the situation where there are one or more free agents and at most one call in the queue. This method is a variation of the Adaptive Shift and Static Shift Methods that attempts to adjust the affine shift to the configuration at each point in time. The point of view is that all gaps should be considered in determining the edge adjustment—not just the two edge gaps.

```
avg_distance = 0
for(j in 1:(length(ap_freeagents)−1))
    {
        avg_distance = avg_distance + ((ap_freeagents[j+1]−ap_freeagents[j])^2)/2
    }
avg_distance = avg_distance + ((min(ap_freeagents)+(1−max(ap_freeagents)))^2)/2
ap = (base_ap − min(ap_freeagents))*(1−2*avg_distance)/(max(ap_freeagents)−min(ap_freeagents)) +
avg_distance.
```

Theory: This method is an attempt to address the major weakness of the Adaptive Shift Method. That is—the direct interaction between the top and bottom agents which lowers match performance and makes kappa difficult to implement. This method is a variation of the Adaptive Shift and Static Shift Methods that attempts to adjust the affine shift to the configuration at each point in time. The point of view is that all gaps should be considered in determining the edge adjustment—not just the two edge gaps. This method likely could be improved with tweaks.
Kappa: For adm, kappa is applied directly.

adm_ap with kappa=adm_ap^kappa

Average Distance Method: L2:
Method: The same theory as for the Adaptive Shift Methodology.
Theory: The same method as for the Adaptive Shift Methodology.
Rho: For adm, rho is applied directly via the formula below.

adm_cp with rho=adm_cprho.

Alternating Circle Method: L1:
Method: This is the situation where there are one or more free agents and at most one call in the queue. At any point in time, map the percentiles of the free agents to the circle [−1,1) by alternating the signum. In addition, we randomize the starting signum. First we tried only varying the signum on the freeagents. That is:

(acl_ap[freeagents])[$i$]=rbinom(1,1,0.5)*(base_ap[freeagents])[$i$]*(−1)^$i$.

The caller cp is not altered. Distances are computed based on identifying −1 and +1. Unfortunately, numerical experimentation showed a higher order masking effect due the reason for which is not clear. For this reason we tried a static variation of the signum. That is:

acl_ap[$i$]=rbinom(1,1,0.5)*acl_ap[$i$]*(−1)^$i$

Again, the caller cp is not altered and distances are computed based on identifying −1 and +1. This resulted in perfect homogenization of utilization.
Theory: The basis for this method is the observation that there would be no edge effect if there were no edge. In this case we change the topology so that the agent and caller percentiles are evenly distributed along a circle of length 2 (take the interval [−1,+1] and identify the endpoints −1 and +1). By randomizing the starting signum for the free agents, we can leave the caller on the [0,1) portion of the circle. The shortcoming of this method is that sometimes the caller cp is far from the endpoints 0 and 1, but the "best" match is on the negative side of the circle and the second "best" match is not very good.
Kappa: For acl, kappa is applied directly with the formula below.

acl_ap with kappa=|acl_ap|^kappa*signum(acl_ap).

Alternating Circle Method: L2:
Method: This is the situation where there are one or more callers in the queue and at most one free agent. At any point in time, map the percentiles of the callers in the queue to the circle [−1,+1] by alternating the signum. In addition, we randomize the starting signum. That is:

(acl_cp[callqueue])[$i$]=rbinom(1,1,0.5)*(base_cp[callqueue])[$i$]*(−1)^$i$

Distances are computed based on identifying −1 and +1.
Theory: The basis for this method is the observation that there would be no edge effect if there were no edge. That is, if the agent and caller percentiles were evenly distributed along a circle of length 2. By randomizing the starting signum for the call queue, we can leave the agent on the [0,1) portion of the circle. The shortcoming of this method is that sometimes the agent ap is far from the endpoints 0 and 1, but the "best" match is on the negative side of the circle and the second "best" match is not very good.
Rho: For acl, rho is applied directly via the formula below.

acl_cp with rho=|acl_cp|^rho*signum(acl_cp)

Look Ahead Method: L1:
Method: This is a fairly complex method.

```
bestagent_now = bestagent
count_freeagents = sum(agents == 0)
freeagent_score = rep(0,count_freeagents)
penalty = rep(0,count_freeagents)
discount_factor = 1.0
```

```
    for(j in 1:count_freeagents)
    {
        penalty[j] = abs(ap_freeagents[j]-thecall)
        post_ap_freeagents = ap_freeagents[-j]
        freeagent_score[j] = (post_ap_freeagents[1]^2)/2 + (1-
post_ap_freeagents[count_freeagents-1]^2)/2
        if(count_freeagents > 2)
        {
            for(k in 1:(count_freeagents-2))
            {
                freeagent_score[j] = freeagent_score[j] + ((post_ap_freeagents[k+1]-
post_ap_freeagents[k])^2)/4
            }
        }
    }
    bestagent2 = which(freeagents)[which.min(penalty + freeagent_score*discount_factor)]
    if(bestagent[1] != bestagent2[1]){now_ne_lah_counter = now_ne_lah_counter + 1}.
```

Theory: This method is an attempt modify the current greedy method into one that penalizes the greed to the extent that it makes the next caller's expected distance greater.
Kappa: For adm, kappa is applied directly.

lah_ap with kappa=lah_ap^kappa.

Look Ahead Method: L2:
Theory: The same method as for the Adaptive Shift Methodology.
Rho: For lah, rho is applied directly via the formula below.

lah_cp with rho=lah_cp^rho.

Edge Utilization: The graphs for kappa=1, were examined. The results are summarized here and several of these graphs are included to make the visualization clear. The first graph illustrates the situation without an edge correction.

For mu=40, acl, and asm agent utilization graphs have the desired flat profile. The profile for ssm6 is V shaped (however, only a small portion of the variability is attributable to this shape—the range of the utilization is 90 for ssm6 and 69/70 for asm/acl). The agent utilization graph for adm is W shaped. For now and lah the shape is an upside down U.

For mu=20: acl, asm, ssm6 agent utilization graphs have the desired flat profile, the agent utilization graph for adm is W shaped. For now and lah the shape is an upside down U.

For mu=10, 5, 2: acl, asm, and ssm6 have the desired flat profile. The rest do not.

For mu=0: acl and asm have the desired flat profile. ssm6 has a bit of a shape to it, but the difference between highest and lowest agent utilization is only slightly higher than for acl and asm.

The graphs for kappa=1.2 and 1.4 were examined. The results are summarized and several graphs are included to make the visualization clear.

Acl accommodates kappa seamlessly, with a monotonically increasing utilization now, asm, ssm5 and ssm6 have utilization that decreases for high ap. The decrease in utilization for highest ap agents is greatest for now and least for ssm6. The decrease for ssm6 is sufficiently small that we believe there is no reason to look for a better solution at this time.

The method selected for actual implementation depends on a variety of factors. Including:

Importance of minimizing agent and caller percentile differences.

Agent utilization requirements of call center

Service level agreements concerning caller wait times

Technological implementation limitations

Higher dimensional analogues occur when additional agent and caller parameters are matched. Other topologies are also possible. For instance, the most straight forward extension is for the agent and caller to each be characterized by two independent parameters, the first being the performance percentile as previously discussed and the second being a percentile based on the expected handle time for the agent and caller, respectively. The edge compensation algorithm analogues of the methods discussed above would then correspond to insertion of a margin at the edge (additionally widened near the vertices) or alteration of the topology from a square to a cylinder or torus). If categorical parameters are matched, the topology may be disconnected.

Figure 12:
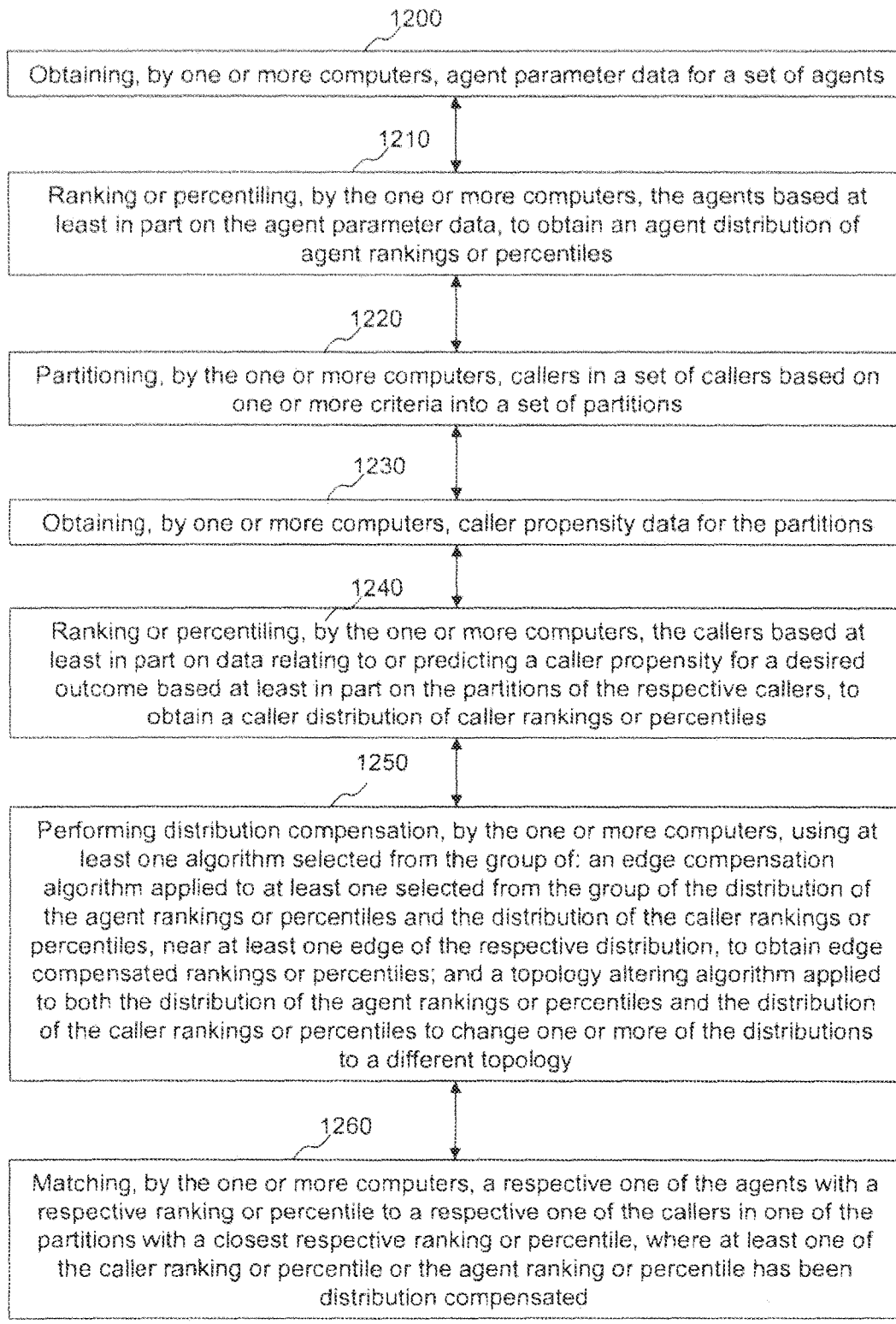
FIG. 12 illustrates an exemplary probability matching process or computer model for matching callers to agents using distribution compensation.

Referring to FIG. 12. embodiments of a method are disclosed for distribution compensation. Block 1200 represents an operation of obtaining, by one or more computers, agent parameter data for a set of agents.

Block 1210 represents an operation of ranking or percentiling, by the one or more computers, the agents based at least in part on the agent parameter data, to obtain an agent distribution of agent rankings or percentiles. In embodiments, agent performance comprises one or more selected from the group of sale or no sale, number of items sold per call, and revenue per call coupled with handle time Block 1220 represents an operation of partitioning, by the one or more computers, callers in a set of callers based on one or more criteria into a set of partitions. In embodiments, the partition for the callers is based at least in part on one or more selected from the group of demographic data, area code, zip code, NPANXX, VTN, geographic area, 800 number, and transfer number.

Block 1230 represents an operation of obtaining, by one or more computers, caller propensity data for the respective partitions.

Block 1240 represents an operation of ranking or percentiling, by the one or more computers, the callers based at least in part on data relating to or predicting a caller propensity for a desired outcome based at least in part on the caller propensity data of the partitions of the respective callers, to obtain a caller distribution of caller rankings or percentiles.

Block 1250 represents an operation of performing distribution compensation, by the one or more computers, using at least one algorithm selected from the group of: an edge compensation algorithm applied to at least one selected from the group of the distribution of the agent rankings or percentiles and the distribution of the caller rankings or percentiles, near at least one edge of the respective distribution, to obtain edge compensated rankings or percentiles; and a topology altering algorithm applied to either or both of the distribution of the agent rankings or percentiles and the distribution of the caller rankings or percentiles to change the distributions to a different topology.

In embodiments, the performing the distribution compensation step uses the edge compensation algorithm and may provide edge compensation only to the agent rankings or percentiles. In embodiments, the performing the distribution compensation step uses the edge compensation algorithm and may provide edge compensation only to the caller rankings or percentiles. In embodiments, the performing the distribution compensation step uses the edge compensation algorithm and may provide edge compensation to both the caller rankings or percentiles and the agent rankings or percentiles.

In embodiments, the distribution compensation step uses the edge compensation algorithm and may takes the agents that are free at runtime, and rescale the respective agent rankings or percentiles for these runtime available agents to provide more space/margin at the edges of the agent distribution. In embodiments, the amount of the margin is based at least in part on a number of the agents that are free at runtime.

In embodiments, the distribution compensation step uses the edge compensation algorithm and may takes the callers in a queue or other grouping at runtime and rescale the respective caller propensity rankings or percentiles, to provide more space/margin at the edges of the distribution. In embodiments, the amount of the margin is based at least in part on a number of callers that are in the queue or in the grouping at runtime.

In embodiments, the distribution compensation step uses the edge compensation algorithm and may weight multiple of the agents free at runtime near at least one edge of the agent distribution and weight multiple of the callers near at least one edge of the caller distribution to increase utilization of the agents at the at least one edge of the agent distribution.

In embodiments, the distribution compensation step uses the edge compensation algorithm and may weight multiple of the agents free at runtime near both edges of the agent distribution or weight multiple of the callers near both edges of the caller distribution.

Block 1260 represents an operation of matching, by the one or more computers, a respective one of the agents with a respective ranking or percentile to a respective one of the callers in one of the partitions with a closest respective ranking or percentile, where at least one of the caller ranking or percentile or the agent ranking or percentile has been distribution compensated.

In embodiments, the distribution compensation step uses the topology altering algorithm, which algorithm may convert the distribution of the agent performances and the distribution of the caller to a circle.

In embodiments, the distribution compensation step uses the topology altering algorithm, which algorithm may convert the distribution of the agent performances and the distribution of the caller to remove the edges of the distribution.

In embodiments where the distribution compensation step uses the edge compensation algorithm, the Kappa for the distribution of the agents may be greater than 1.0.

In embodiments, rho applied to the callers in a queue may be 1.0. Note that rho is the analogue for Kappa as applied to calls. A rho=1.0 is the analogue of a flat utilization of calls, e.g., the same expected L2 wait time for all call CP's. A rho greater than 1.0 is a setting in which there is a bias to answer the highest ranked or percentiled calls first.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 10:
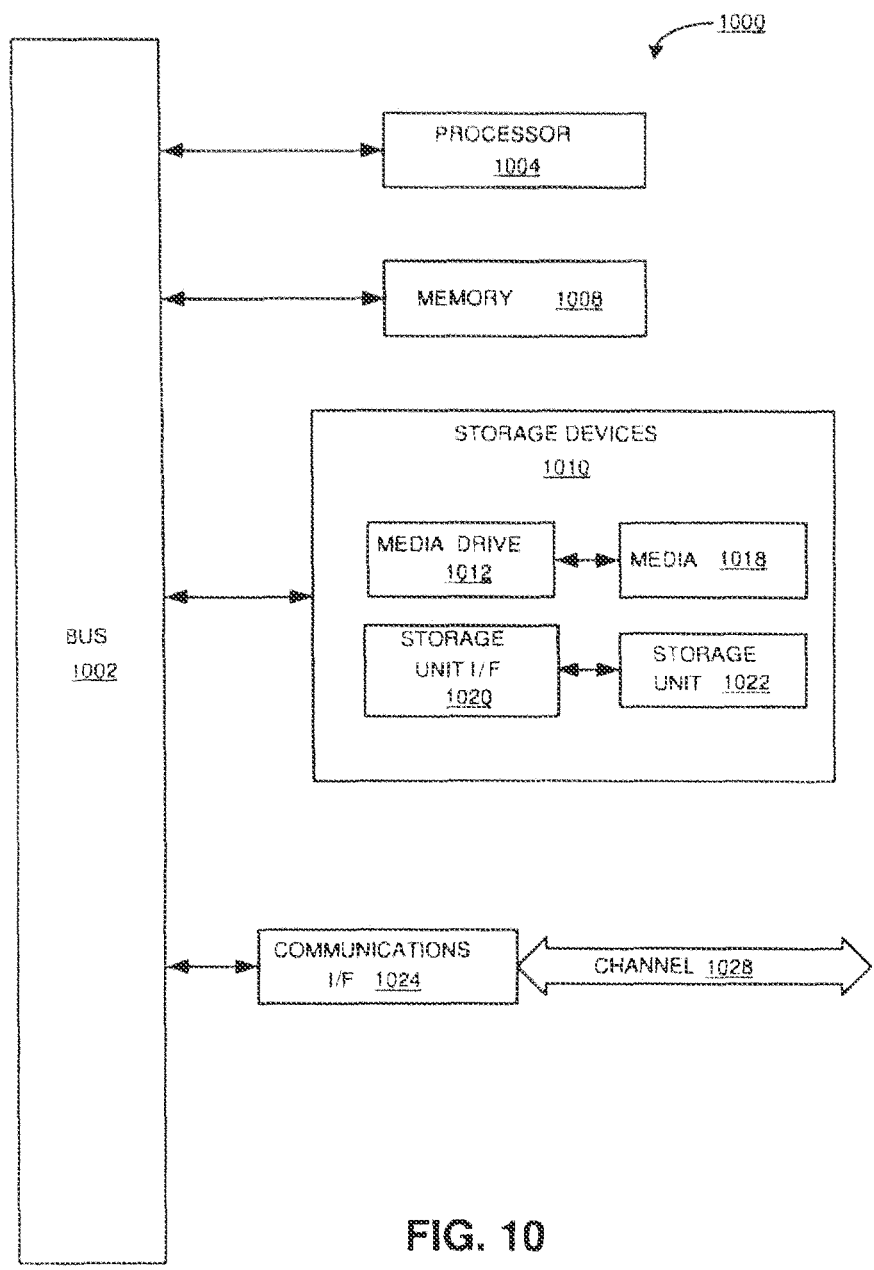
FIG. 10 illustrates a typical computing system that may be employed to implement some or all processing functionality in certain embodiments of the invention.

FIG. 10 illustrates a typical computing system 1000 that may be employed to implement processing functionality in embodiments of the invention. Computing systems of this type may be used in clients and servers, for example. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special purpose processing engine such as, for example, a microprocessor, microcontroller or other control logic. In this example, processor 1004 is connected to a bus 1002 or other communication medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory ("ROM") or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1018 may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having stored therein particular computer software or data.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a USB port), a PCMCIA slot and card, etc. Software and data transferred via communications interface 1024 are in the form of signals which can be electronic, electromagnetic, optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 1008, storage media 1018, or storage unit 1022. These and other forms of computer-readable media may be involved in storing one or more instructions for use by processor 1004, to cause the processor to perform specified operations. Such instructions, generally referred to as "computer program code" (which may be grouped in the form of computer programs or other groupings), when executed, enable the computing system 1000 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage media 1018, drive 1012 or communications interface 1024. The control logic (in this example, software instructions or computer program code), when executed by the processor 1004, causes the processor 1004 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the present invention are merely meant to be illustrative and not limiting. Various changes and modifications may be made without departing from the invention in its broader aspects. The appended claims encompass such changes and modifications within the spirit and scope of the invention.

The invention claimed is:

1. A method for handling contacts and agents in a contact center system comprising:
   identifying, by at least one computer processor configured to operate in the contact center system, a plurality of contacts with an order according to an initial normalized ranking, wherein each of the plurality of contacts is waiting in a queue in the contact center system for connection to one of a plurality of agents assigned to the queue in the contact center system;
   rescaling, by the at least one computer processor, the initial normalized ranking of the plurality of contacts while maintaining the order of the plurality of contacts and maintaining the plurality of agents assigned to the queue in the contact center system, such that the plurality of agents assigned to the queue are available for connection to one of the plurality of contacts waiting in the queue, wherein the rescaling changes an expected waiting time of at least one contact of the plurality of contacts for connection to one of the plurality of agents assigned to the queue in the contact center system; and
   establishing, by the at least one computer processor, in a switch of the contact center system, a connection between one of the at least one contact and the one of the plurality of agents based upon the rescaled ranking of the plurality of contacts to optimize performance of the contact center system attributable to the rescaled ranking.

2. The method of claim 1, further comprising:
   determining, by the at least one computer processor, an initial range of normalized scores for the initial normalized ranking; and
   determining, by the at least one computer processor, an adjusted range of normalized scores for the rescaled initial normalized ranking.

3. The method of claim 2, wherein the adjusted range of scores is a function of a number of contacts that are waiting for an agent.

4. The method of claim 1, wherein the rescaling decreases an expected waiting time of a highest-scored contact relative to a middle-scored contact.

5. The method of claim 4, wherein the rescaling decreases an expected waiting time of a lowest-scored contact relative to a middle-scored contact.

6. The method of claim 4, wherein the rescaling increases a uniformity of expected waiting times of the plurality of contacts relative to initial expected waiting times of the plurality of contacts.

7. The method of claim 1, wherein the rescaling increases a uniformity of an expected waiting time of the plurality of contacts.

8. A system for handling contacts and agents in a contact center system comprising:

at least one computer processor configured to operate in the contact center system, wherein the at least one computer processor is configured to:
- identify a plurality of contacts with an order according to an initial normalized ranking, wherein each of the plurality of contacts is waiting in a queue in the contact center system for connection to one of a plurality of agents assigned to the queue in the contact center system;
- rescale the initial normalized ranking of the plurality of contacts while maintaining the order of the plurality of contacts and maintaining the plurality of agents assigned to the queue in the contact center system, such that the plurality of agents assigned to the queue are available for connection to one of the plurality of contacts waiting in the queue, wherein the rescaling changes an expected waiting time of at least one contact of the plurality of contacts for connection to one of the plurality of agents assigned to the queue in the contact center system; and
- establish, in a switch of the contact center system, a connection between one of the at least one contact and the one of the plurality of agents based upon the rescaled ranking of the plurality of contacts to optimize performance of the contact center system attributable to the rescaled ranking.

9. The system of claim 8, further comprising:
determine an initial range of normalized scores for the initial normalized ranking; and
determine an adjusted range of normalized scores for the rescaled initial normalized ranking.

10. The system of claim 9, wherein the adjusted range of normalized scores is a function of a number of contacts that are waiting for an agent.

11. The system of claim 8, wherein the rescaling decreases an expected waiting time of a highest-scored contact relative to a middle-scored contact.

12. The system of claim 11, wherein the rescaling decreases an expected waiting time of a lowest-scored contact relative to a middle-scored contact.

13. The system of claim 11, wherein the rescaling increases a uniformity of expected waiting times of the plurality of contacts relative to initial expected waiting times of the plurality of contacts.

14. The system of claim 8, wherein the rescaling increases a uniformity of an expected waiting time of the plurality of contacts.

15. An article of manufacture for handling contacts and agents in a contact center system comprising:
- a non-transitory computer processor readable medium; and
- instructions stored on the medium;
- wherein the instructions are configured to be readable from the medium by at least one computer processor configured to operate in the contact center system and thereby cause the computer processor to operate so as to:
  - identify a plurality of contacts with an order according to an initial normalized ranking, wherein each of the plurality of contacts is waiting in a queue in the contact center system for connection to one of a plurality of agents assigned to the queue in the contact center system;
  - rescale the initial normalized ranking of the plurality of contacts while maintaining the order of the plurality of contacts and maintaining the plurality of agents assigned to the queue in the contact center system, such that the plurality of agents assigned to the queue are available for connection to one of the plurality of contacts waiting in the queue, wherein the rescaling changes an expected waiting time of at least one contact of the plurality of contacts for connection to one of the plurality of agents assigned to the queue in the contact center system; and
  - establish, in a switch of the contact center system, a connection between one of the at least one contact and the one of the plurality of agents based upon the rescaled ranking of the plurality of contacts to optimize performance of the contact center system attributable to the rescaled ranking.

16. The article of manufacture of claim 15, further comprising:
determine an initial range of normalized scores for the initial normalized ranking; and
determine an adjusted range of normalized scores for the rescaled initial normalized ranking.

17. The article of manufacture of claim 16, wherein the adjusted range of normalized scores is a function of a number of contacts that are waiting for an agent.

18. The article of manufacture of claim 15, wherein the rescaling decreases an expected waiting time of a highest-scored contact relative to a middle-scored contact.

19. The article of manufacture of claim 18, wherein the rescaling decreases an expected waiting time of a lowest-scored contact relative to a middle-scored contact.

20. The article of manufacture of claim 15, wherein the rescaling increases a uniformity of an expected waiting time of the plurality of contacts.

* * * * *